United States Patent
Aoki et al.

(10) Patent No.: US 10,303,873 B2
(45) Date of Patent: May 28, 2019

(54) DEVICE FOR DETECTING MALWARE INFECTED TERMINAL, SYSTEM FOR DETECTING MALWARE INFECTED TERMINAL, METHOD FOR DETECTING MALWARE INFECTED TERMINAL, AND PROGRAM FOR DETECTING MALWARE INFECTED TERMINAL

(71) Applicant: NIPPON TELEGRAPH AND TELEPHONE CORPORATION, Chiyoda-ku (JP)

(72) Inventors: Kazufumi Aoki, Tokyo (JP); Kazunori Kamiya, Tokyo (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 71 days.

(21) Appl. No.: 15/558,248

(22) PCT Filed: Mar. 8, 2016

(86) PCT No.: PCT/JP2016/057119
§ 371 (c)(1),
(2) Date: Sep. 14, 2017

(87) PCT Pub. No.: WO2016/147944
PCT Pub. Date: Sep. 22, 2016

(65) Prior Publication Data
US 2018/0046800 A1    Feb. 15, 2018

(30) Foreign Application Priority Data
Mar. 18, 2015 (JP) ................. 2015-055281

(51) Int. Cl.
*G06F 21/55* (2013.01)
*G06F 21/56* (2013.01)
(Continued)

(52) U.S. Cl.
CPC .......... *G06F 21/56* (2013.01); *G06F 11/3006* (2013.01); *G06F 21/554* (2013.01);
(Continued)

(58) Field of Classification Search
CPC .......... G06F 21/53; G06F 21/55; G06F 21/56; G06F 21/554; G06F 11/30;
(Continued)

(56) References Cited

U.S. PATENT DOCUMENTS 7,308,714 B2 * 12/2007 Bardsley ................. G06F 21/55
709/223
8,370,931 B1    2/2013 Chien et al.
(Continued)

FOREIGN PATENT DOCUMENTS

JP          5009244 B2      8/2012
WO    WO 2016/076334 A1    5/2016

OTHER PUBLICATIONS

Extended European Search Report dated Aug. 30, 2018 in Patent Application No. 16764774.2, 11 pages.
(Continued)

*Primary Examiner* — Jayesh M Jhaveri
(74) *Attorney, Agent, or Firm* — Oblon, McClelland, Maier & Neustadt, L.L.P.

(57) ABSTRACT

A detection device generates an event sequence from events that are acquired for each of identifiers that distinguish among terminals in a monitoring target network or pieces of malware, by taking into account an order of occurrence of the events. The detection device retrieves events that commonly occur in event sequences belonging to a same cluster among clusters including event sequences with similarities at a predetermined level or higher, and extracts, as a detection event sequence, a representative event sequence based on a relationship between events that have high occurrence
(Continued)

rates in similar common event sequences. The detection device detects a malware infected terminal in the monitoring target network based on whether the event sequence generated based on a communication in the monitoring target network and the extracted detection event sequence match each other.

8 Claims, 14 Drawing Sheets

(51) Int. Cl.
G06F 11/30 (2006.01)
H04L 29/06 (2006.01)
G06F 21/53 (2013.01)
G06F 16/901 (2019.01)
G06F 17/30 (2006.01)

(52) U.S. Cl.
CPC .... *G06F 16/9024* (2019.01); *G06F 17/30958* (2013.01); *G06F 21/53* (2013.01); *H04L 63/14* (2013.01); *H04L 63/1416* (2013.01)

(58) Field of Classification Search
CPC ............... G06F 11/3006; G06F 16/901; G06F 16/9024; G06F 17/30958; H04L 63/14; H04L 63/1416; H04L 29/06
See application file for complete search history.

(56) References Cited

U.S. PATENT DOCUMENTS

| | | |
|---|---|---|
| 2005/0086538 A1 | 4/2005 | Kubota |
| 2007/0136455 A1* | 6/2007 | Lee ........................ G06F 21/564 709/223 |
| 2013/0019309 A1* | 1/2013 | Strayer .................... G06N 5/04 726/23 |
| 2013/0276117 A1 | 10/2013 | Hwang |
| 2014/0123280 A1 | 5/2014 | Kedma et al. |
| 2015/0304345 A1* | 10/2015 | Muller ................ H04L 63/1425 726/23 |
| 2017/0339171 A1 | 11/2017 | Aoki et al. |
| 2018/0096149 A1* | 4/2018 | Morkovsk ............... G06F 21/52 |

OTHER PUBLICATIONS

International Search Report dated Jun. 14, 2016 in PCT/JP2016/057119 filed Mar. 8, 2016.
"The Advanced Cyber Attack Landscape" FireEye, Inc., 2013. 14 Pages.
"Annual Report Pandalabs 2013 Summary" Panda Security, 2014, 17 Pages.
Sebastián García, et al., "Survey on network-based botnet detection methods" Security and Communication Networks, 2013, 26 Pages.
Kazunori Kamiya, et al., "Firewall Log o Mochiita Malware Kansen Tanmatsu no Kenchi Shuho" Proceedings of the 77*th* National Convention of Information Processing Society of Japan, 4E-03, 2015, pp. 3-433-3-434.
Japanese Office Action dated May 29, 2018 in Patent Application No. 2017-506466 (with English translation), 4 pages.

* cited by examiner

FIG.2

| IDENTIFIER FOR HOST IN MONITORING TARGET NW | EVENT | EVENT OCCURRENCE TIME | ... |
|---|---|---|---|
| ... | ... | ... | ... |
| 192.168.10.11 | DETECTION OF COMMUNICATION WITH SPECIFIC COMMUNICATION DESTINATION | 2014/10/15 12:20:12 | ... |
| 192.168.10.11 | DETECTION OF COMMUNICATION y TIMES IN X TIME | 2014/10/15 12:20:15 | ... |
| 192.168.10.11 | DETECTION OF TRANSMISSION OF MALICIOUS DATA | 2014/10/15 12:20:20 | ... |
| ... | ... | ... | ... |

FIG.3

| MALWARE IDENTIFIER | EVENT | EVENT OCCURRENCE TIME | ... |
|---|---|---|---|
| ... | ... | ... | ... |
| e5fa44f2b31c1fb553b6021e7360d07d5d91ff5e | DETECTION OF COMMUNICATION WITH SPECIFIC COMMUNICATION DESTINATION | 2014/9/16 22:25:14 | ... |
| e5fa44f2b31c1fb553b6021e7360d07d5d91ff5e | DETECTION OF COMMUNICATION Y TIMES IN X TIME | 2014/9/16 22:25:16 | ... |
| e5fa44f2b31c1fb553b6021e7360d07d5d91ff5e | DETECTION OF TRANSMISSION OF MALICIOUS DATA | 2014/9/16 22:25:21 | ... |
| ... | ... | ... | ... |

FIG.9
(a)
SEQUENCE IN MONITORING TARGET NW ANALYSIS RESULT: 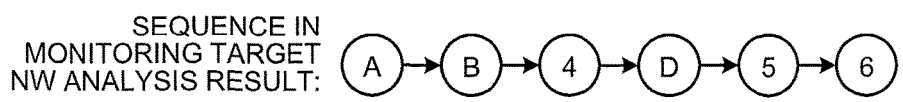
(b)
COMMON EVENT SEQUENCE 1: 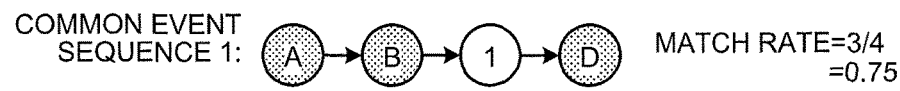 MATCH RATE=3/4 =0.75
COMMON EVENT SEQUENCE 2: 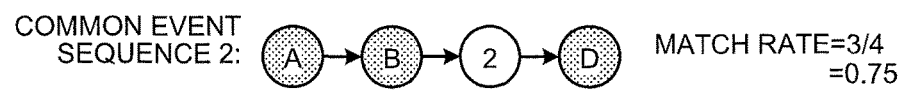 MATCH RATE=3/4 =0.75
COMMON EVENT SEQUENCE 3: 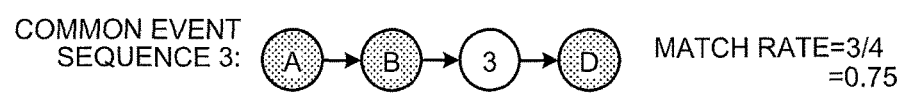 MATCH RATE=3/4 =0.75
(c)
REPRESENTATIVE EVENT SEQUENCE: 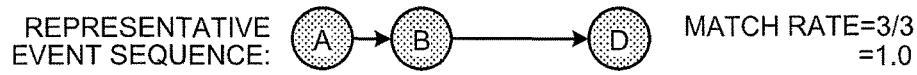 MATCH RATE=3/3 =1.0

US 10,303,873 B2

DEVICE FOR DETECTING MALWARE INFECTED TERMINAL, SYSTEM FOR DETECTING MALWARE INFECTED TERMINAL, METHOD FOR DETECTING MALWARE INFECTED TERMINAL, AND PROGRAM FOR DETECTING MALWARE INFECTED TERMINAL

FIELD

The present invention relates to a device for detecting a malware infected terminal, a system for detecting a malware infected terminal, a method for detecting a malware infected terminal, and a program for detecting malware infected terminal.

BACKGROUND

In recent years, unauthorized programs (hereinafter, referred to as "malware") that pose a threat, such as information leakage or unauthorized access, are rampant. Malware receives a command from an attacker via a server or the like after infection, and poses a threat, such as attack or information leakage. Recent malware takes an approach to perform a fake communication with the attacker as a normal communication (see, for example, Non Patent Literature 1).

The number of pieces of detected malware is significantly increasing, and it has been reported that a new piece of malware emerges every few seconds (see, for example, Non Patent Literature 2). Therefore, it is difficult to prevent the threat of malware only by a countermeasure, such as antivirus software, taken by a host. To cope with this, a method of analyzing communication data and identifying a terminal infected by malware to reduce the threat of malware has attracted attention (see, for example, Non Patent Literature 3).

As a method of detecting a malware infected terminal, a method of generating patterns of characteristics of communications observed in malware infected terminals to detect a malware infected terminal is known (see, for example, Patent Literature 1). Examples of the method of detecting a malware infected terminal include a method of taking communication data as an analysis target, making patterns of communication data obtained through a malware analysis, and checking whether the same pattern appears in communications in a monitoring target network (NW) to detect a malware infected terminal.

CITATION LIST

Patent Literature

Patent Literature 1: Japanese Patent No. 5009244

Non Patent Literature

Non Patent Literature 1: The Advanced Cyber Attack Landscape, [online], [searched on Sep. 4, 2014], Internet <URL: http://www.fireeye.com/jp/ja/resources/pdfs/fireeye-advanced-cyber-attack-landscape.pdf>
Non Patent Literature 2: Annual Report Pandalabs 2013 summary, [online], [searched on Sep. 3, 2014], Internet <URL: http://press.pandasecurity.com/wp-content/uploads/2010/05/PandaLabs-Annual-Report2013.pdf>
Non Patent Literature 3: Sebastian Garcia et al., Survey on network-based botnet detection methods, Security and communication networks 2013, [online], [searched on Mar. 13, 2014], Internet <URL: http://onlinelibrary.wiley.com/doi/10.1002/sec.800/full>

SUMMARY

Technical Problem

However, the above-described conventional technology has problems as described below. Specifically, in recent years, an enormous number of pieces of malware occur as described above; therefore, if patterns are generated for all of the communications of all pieces of malware, an enormous number of patterns are generated and it takes a long time to determine whether the patterns are found in communications in a monitoring target network. Furthermore, in the conventional technology as described above, a state is defined for each communication payload and patterns of state transition are generated; therefore, a new pattern is generated only when a piece of malware performs a communication using a different communication payload. Moreover, communications similar to a communication performed by an uninfected terminal are observed in communications of malware; therefore, if all of the communication patterns are used for detection in communications in the monitoring target network, false detection is likely to occur.

To solve the problems as described above, an object of the present invention is to provide a device, a method, and a program for detecting a malware infected terminal.

Solution to Problem

To solve a problem and to achieve an object, a device for detecting a malware infected terminal, the device includes: a sequence generation unit that generates an event sequence from events that match a rule characterizing a communication among communications in a monitoring target network and communications caused by malware and that are acquired for each of identifiers that distinguish among terminals in the monitoring target network or pieces of malware, by taking into account an order of occurrence of the events; a detection sequence extraction unit that retrieves events that commonly occur in event sequences belonging to a same cluster among clusters including event sequences with similarities at a predetermined level or higher among event sequences based on a communication caused by malware, extracts, as common event sequences, event sequences in which the retrieved events are connected in chronological order in a predetermined length or longer, and extracts, as a detection event sequence, a representative event sequence based on a relationship between events that have high occurrence rates in similar common event sequences among the plurality of common event sequences; and a detection unit that detects that a malware infected terminal is present in the monitoring target network when it is determined that the event sequence generated by the sequence generation unit based on a communication in the monitoring target network and the detection event sequence extracted by the detection sequence extraction unit match each other.

A system for detecting a malware infected terminal, the system includes: a malware execution environment; a monitoring target network; and a device for detecting a malware infected terminal, wherein the device for detecting a malware infected terminal includes a sequence generation unit that generates an event sequence from events that match a rule characterizing a communication among communications in the monitoring target network and communications caused by malware executed in the malware execution environment and that are acquired for each of identifiers that distinguish among terminals in the monitoring target network or pieces of malware, by taking into account an order of occurrence of the events; a detection sequence extraction unit that retrieves events that commonly occur in event sequences belonging to a same cluster among clusters including event sequences with similarities at a predetermined level or higher among event sequences based on a communication caused by malware, extracts, as common event sequences, event sequences in which the retrieved events are connected in chronological order in a predetermined length or longer, and extracts, as a detection event sequence, a representative event sequence based on a relationship between events that have high occurrence rates in similar common event sequences among the plurality of common event sequences; and a detection unit that detects that a malware infected terminal is present in the monitoring target network when it is determined that the event sequence generated by the sequence generation unit based on a communication in the monitoring target network and the detection event sequence extracted by the detection sequence extraction unit match each other.

A method for detecting a malware infected terminal executed in a system for detecting the malware infected terminal, the system including a malware execution environment, a monitoring target network, and a device for detecting a malware infected terminal, the method includes: generating an event sequence from events that match a rule characterizing a communication among communications in the monitoring target network and communications caused by malware executed in the malware execution environment and that are acquired for each of identifiers that distinguish among terminals in the monitoring target network or pieces of malware, by taking into account an order of occurrence of the events; retrieving events that commonly occur in event sequences belonging to a same cluster among clusters including event sequences with similarities at a predetermined level or higher among event sequences based on a communication caused by malware; extracting, as common event sequences, event sequences in which the retrieved events are connected in chronological order in a predetermined length or longer; extracting, as a detection event sequence, a representative event sequence based on a relationship between events that have high occurrence rates in similar common event sequences among the plurality of common event sequences; and detecting that a malware infected terminal is present in the monitoring target network when it is determined that the event sequence generated at the generating based on a communication in the monitoring target network and the detection event sequence extracted at the extracting match each other.

A program for detecting a malware infected terminal executed by a computer, the program includes: generating an event sequence from events that match a rule characterizing a communication among communications in a monitoring target network and communications caused by malware and that are acquired for each of identifiers that distinguish among terminals in the monitoring target network or pieces of malware, by taking into account an order of occurrence of the events; retrieving events that commonly occur in event sequences belonging to a same cluster among clusters including event sequences with similarities at a predetermined level or higher among event sequences based on a communication caused by malware; extracting, as common event sequences, event sequences in which the retrieved events are connected in chronological order in a predetermined length or longer; extracting, as a detection event sequence, a representative event sequence based on a relationship between events that have high occurrence rates in similar common event sequences among the plurality of common event sequences; and detecting that a malware infected terminal is present in the monitoring target network when it is determined that the event sequence generated at the generating based on a communication in the monitoring target network and the detection event sequence extracted at the extracting match each other.

Advantageous Effects of Invention

According to an aspect of the present invention, it is possible to reduce patterns to be matched in a monitoring target NW, reduce the time taken to perform matching, and reduce the possibility of false detection of a communication that normally occurs in the monitoring target NW.

BRIEF DESCRIPTION OF DRAWINGS

FIG. 2 is a schematic diagram illustrating an example of a monitoring target NW analysis result according to the embodiment.

FIG. 3 is a schematic diagram illustrating an example of a malware communication analysis result according to the embodiment.

FIG. 9 is a schematic diagram illustrating an example of a process in an event matching unit according to the embodiment.

DESCRIPTION OF EMBODIMENTS

Embodiments of a device for detecting a malware infected terminal, a system for detecting a malware infected terminal, a method for detecting a malware infected terminal, and a program for detecting a malware infected terminal according to the present application will be described in detail below based on the drawings. The device for detecting a malware infected terminal, the system for detecting a malware infected terminal, the method for detecting a malware infected terminal, and the program for detecting a malware infected terminal according to the present application are not limited by the embodiments.

Outline

Figure 1:
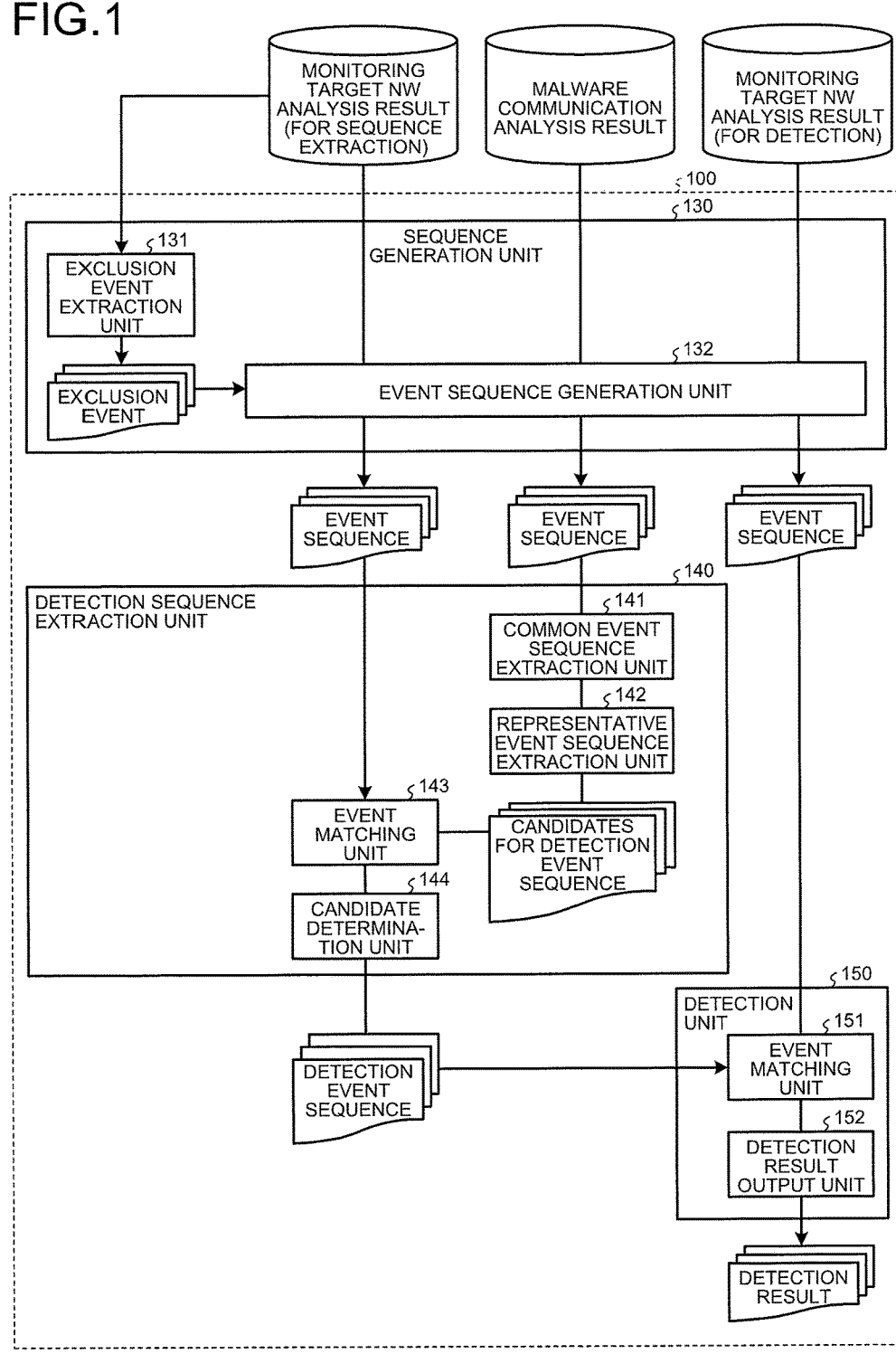
FIG. 1 is a configuration diagram illustrating an outline of a detection device according to an embodiment.

First, with reference to FIG. 1, an outline of a process performed by a detection device 100 as the device for detecting a malware infected terminal will be described. FIG. 1 is a configuration diagram illustrating the outline of the detection device 100 according to the embodiment. As illustrated in FIG. 1, the process performed by the detection device 100 is executed by a sequence generation unit 130, a detection sequence extraction unit 140, and a detection unit 150 included in the detection device 100. The detection device 100 generates a detection event sequence from a monitoring target network (NW) analysis result (for sequence extraction) and a malware communication analysis result, which are collected in advance of performing detection, and checks whether an event sequence generated from a monitoring target NW analysis result (for detection) and the detection event sequence match each other, to thereby detect a terminal (host) infected by malware in a monitoring target NW.

Here, in the monitoring target NW analysis results (for sequence extraction and for detection), data with fields of an identifier for identifying a host in the monitoring target NW, an event, and an event occurrence time is stored. The event means an event that represents each of characteristics when certain characteristics are observed in communications. For example, the event may be an event in which a communication with a specific communication destination is included according to an analysis of a device log recorded by a firewall, a web proxy, or the like, an event in which communications are performed a predetermined number of times or more within a predetermined time, an event in which malicious data is detected by an intrusion detection system (IDS), or the like. That is, the event is an event that matches a rule characterized as having a high probability of a malicious communication among communications in the monitoring target NW. For example, the detection device 100 acquires, as the monitoring target NW analysis result, an event for which it is analyzed whether the event matches a rule characterizing a communication and for which it is determined that the event matches the rule by a predetermined external apparatus. The malware communication analysis result is a result obtained by analyzing communication data by actually running malware in a malware execution environment, such as a sandbox, or the like in the same perspective as taken when the monitoring target NW analysis result is acquired as described above. Furthermore, the event sequence is a sequence in which the monitoring target NW analysis results are arranged in chronological order for each of hosts in the monitoring target NW, or a sequence in which the malware communication analysis results are arranged in chronological order for each of malware samples.

With reference to FIG. 2, an example of the monitoring target NW analysis result will be described. FIG. 2 is a schematic diagram illustrating an example of the monitoring target NW analysis result according to the embodiment. As illustrated in FIG. 2, an event detected for each of identifiers of hosts in the monitoring target NW is stored in association with an event type and an event occurrence time. For example, in FIG. 2, an example is illustrated in which an event of "detection of a communication with a specific communication destination" occurred in a host identified by "192.168.10.11" on "Oct. 15, 2014, at 12:20:12". Next, with reference to FIG. 3, an example of the malware communication analysis result will be described. FIG. 3 is a schematic diagram illustrating an example of the malware communication analysis result according to the embodiment. As illustrated in FIG. 3, an event detected for each of malware identifiers is stored in association with an event type and an event occurrence time, similarly to the monitoring target NW analysis result.

A process performed by the detection device 100 will be described in sequence below. The sequence generation unit 130 of the detection device 100 includes an exclusion event extraction unit 131 and an event sequence generation unit 132, uses the monitoring target NW analysis results and the malware communication analysis result as inputs, and generates an event sequence for each of the inputs. The sequence generation unit 130 generates the event sequence from events that match a rule characterizing a communication among communications in the monitoring target network and communications caused by malware and that are acquired for each of the identifiers that distinguish among terminals in the monitoring target network or pieces of malware, by taking into account the order of occurrence of the events.

Specifically, when the monitoring target NW analysis result (for sequence extraction) is input, the exclusion event extraction unit 131 sets an event that is observed in a large number of hosts in the monitoring target NW as an exclusion event in the analysis result. While a false detection rate can be reduced by providing the exclusion event extraction unit 131, the detection device 100 may be constructed without the exclusion event extraction unit 131.

The event sequence generation unit 132 generates an event sequence of events that do not correspond to the exclusion event in the monitoring target NW analysis results and the malware communication analysis result. In general, only a small number of terminals are infected in the monitoring target NW; therefore, it is possible to determine that an event observed in a large number of hosts does not have a characteristic of a communication caused by malware. Therefore, by excluding the exclusion event, the event sequence generation unit 132 can generate the event sequence excluding an event observed in terminals that are not infected by malware. That is, the event sequence generation unit 132 can reduce false detection in detecting an infected terminal.

Furthermore, the event sequence generation unit 132 generates a single event sequence from events that have occurred at an interval of a predetermined time or shorter among events of a single host or a single piece of malware. Specifically, the event sequence generation unit 132 generates the event sequence by separating a series of events related to a behavior of malware. Moreover, the event sequence generation unit 132 generates the event sequence while excluding redundant events among events of a single host or a single piece of malware.

The process performed by the event sequence generation unit 132 will be described with detailed examples. For example, it is assumed that an event A, an event B, and an event C are observed in order of "ABCABCAA" as an analysis result of a certain host. For example, the event A is an event indicating access to a specific server, the event B is an event indicating a download of a file from a specific server, and the event C is an event indicating access to a predetermined server based on the file downloaded in the event B. In this case, the event sequence generation unit 132 excludes redundant events from a series of the events "ABCABCAA". Specifically, the event sequence generation unit 132 generates "ABC" as an event sequence from "ABCABCAA". That is, the event sequence generation unit 132 adds events of a certain host as elements of the event sequence in order from the earliest occurrence time, and does not add events observed for the second or later time to the event sequence.

With this configuration, even when a communication is repeated due to the timing of execution of malware or a command from a command and control (C&C) server, the event sequence generation unit 132 can generate an event sequence in which a difference in the number of repetitions is absorbed. That is, the event sequence generation unit 132 can improve the accuracy in a detection process to be described later.

Next, a process performed by the detection sequence extraction unit 140 of the detection device 100 will be described. The detection sequence extraction unit 140 includes a common event sequence extraction unit 141, a representative event sequence extraction unit 142, an event matching unit 143, and a candidate determination unit 144, and extracts a detection event sequence on the basis of the event sequences generated by the sequence generation unit 130.

The detection sequence extraction unit 140 retrieves events that commonly occur in event sequences belonging to the same cluster among clusters including event sequences with similarities at a predetermined level or higher among event sequences based on communications caused by malware, extracts, as common event sequences, event sequences in which the retrieved events are connected in chronological order in a predetermined length or longer, and extracts, as a detection event sequence, a representative event sequence based on a relationship between events that have high occurrence rates in similar common event sequences among the plurality of common event sequences.

Specifically, the common event sequence extraction unit 141 calculates the similarities among event sequences extracted from the malware communication analysis result, and then performs clustering. Subsequently, the common event sequence extraction unit 141 extracts events that are commonly observed in the event sequences with the similarities at a predetermined level or higher by taking into account the sequential order, and generates the common event sequences from the events.

The representative event sequence extraction unit 142 extracts, as a candidate for the detection event sequence, a representative event sequence based on relationships among events with high occurrence rates in similar common event sequences among the common event sequences extracted by the common event sequence extraction unit 141. A method of extracting the representative event sequence will be described in detail later.

The event matching unit 143 checks whether event sequences in the monitoring target NW analysis result (for sequence extraction) match the candidates for the detection event sequence, and calculates how many hosts in the monitoring target NW are detected from each of the candidates for the detection event sequence. The event matching unit 143 determines that a determination target event sequence matches a candidate for the detection event sequence when a product of a first match rate, which is a ratio of the length of a matched portion between the determination target event sequence as the event sequence based on a communication in the monitoring target network and a candidate for the detection event sequence to the length of the candidate for the detection event sequence, and a second match rate, which is a ratio of the length of the candidate for the detection event sequence to the length of the longest common event sequence in a cluster to which the candidate for the detection event sequence belongs, is equal to or greater than a predetermined threshold.

The candidate determination unit 144 outputs the candidate for the detection event sequence as the detection event sequence when a ratio of the number of the detected hosts to the total number of the hosts in the monitoring target NW is equal to or smaller than a predetermined value on the basis of the number of the detected hosts that is calculated by the event matching unit 143 for each of the candidates for the detection event sequence.

Next, a process performed by the detection unit 150 of the detection device 100 will be described. The detection unit 150 includes an event matching unit 151 and a detection result output unit 152, and detects a malware infected terminal in the monitoring target NW. The detection unit 150 detects that a malware infected terminal is present in the monitoring target network when it is determined that the event sequence generated by the sequence generation unit 130 based on a communication in the monitoring target network matches the detection event sequence extracted by the detection sequence extraction unit 140.

Specifically, similarly to the event matching unit 143 of the detection sequence extraction unit 140, the event matching unit 151 checks whether event sequences generated from the monitoring target NW analysis result (for detection) match the detection event sequence. The event matching unit 151 determines that a determination target event sequence matches the detection event sequence when a product of a first match rate, which is a ratio of the length of a matched portion between the determination target event sequence as the event sequence based on a communication in the monitoring target network and the detection event sequence to the length of the detection event sequence, and a second match rate, which is a ratio of the length of the detection event sequence to the length of the longest common event sequence in a cluster to which the detection event sequence belongs, is equal to or greater than a predetermined threshold.

The detection result output unit 152 outputs host information for which it is determined that the event sequence matches the detection event sequence as a result of the matching performed by the event matching unit 151. The host information is, for example, an Internet protocol (IP) address of a terminal in the monitoring target NW, or the like.

In this manner, the detection device 100 generates the detection event sequence from the monitoring target NW analysis result (for sequence extraction) and the malware communication analysis result, checks whether the event sequence generated from the monitoring target NW analysis result (for detection) matches the detection event sequence, and detects a terminal infected by malware in the monitoring target NW.

As described above, the detection device 100 according to the embodiment detects an infected terminal by using only the detection event sequence that is a chronological pattern selected as a representative from among chronological patterns having a common characteristic that characterizes malware in a plurality of malware communications. Therefore, according to the detection device 100, it is possible to reduce patterns to be matched in the monitoring target NW, and reduce time taken for matching. Furthermore, the detection device 100 performs the process by using the detection event sequence, in which an event that may be observed in the monitoring target NW and the chronological order of events are eliminated in advance; therefore, it is possible to reduce the possibility of false detection of a communication that normally occurs in the monitoring target NW.

The detection device 100 may generate the detection event sequence by using only the malware communication analysis result, without using the monitoring target NW analysis result (for sequence extraction). The processes performed by the detection device 100 will be described in detail later with reference to flowcharts.

Configuration of Detection Device

Figure 4:
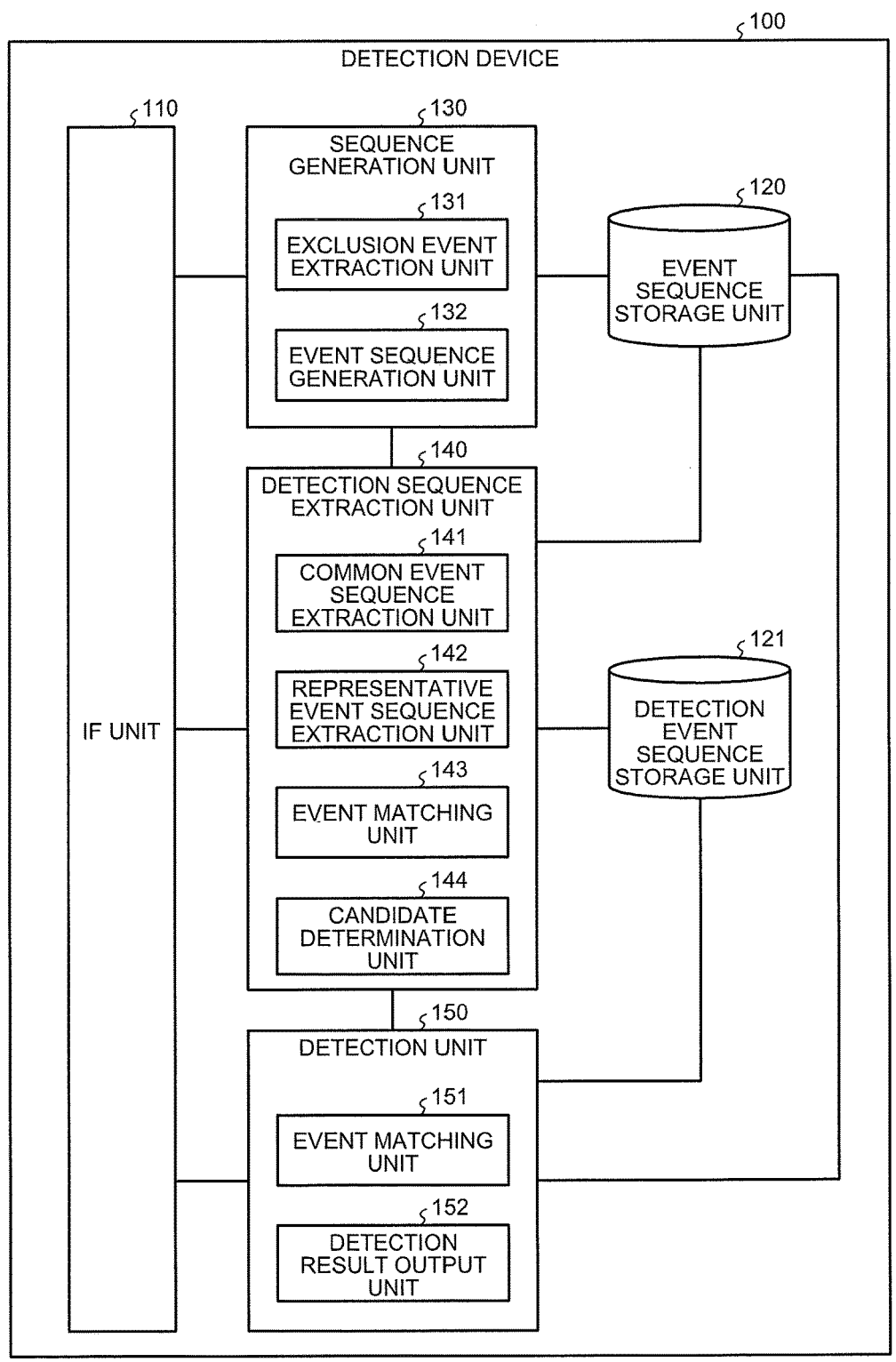
FIG. 4 is a schematic diagram illustrating a configuration example of the detection device according to the embodiment.

Next, with reference to FIG. 4, the detection device 100 according to the embodiment will be described. FIG. 4 is a schematic diagram illustrating a configuration example of the detection device 100 according to the embodiment.

As illustrated in FIG. 4, the detection device 100 according to the embodiment includes an interface (IF) unit 110, an event sequence storage unit 120, a detection event sequence storage unit 121, the sequence generation unit 130, the detection sequence extraction unit 140, and the detection unit 150.

The IF unit 110 is, for example, a network interface card (NIC) or the like, and transmits and receives various kinds of data to and from an external apparatus. For example, the IF unit 110 receives, as the monitoring target NW analysis result, a result of analysis of a device log or the like in a firewall, a web proxy, or the like installed in the monitoring target NW.

The event sequence storage unit 120 and the detection event sequence storage unit 121 are implemented by, for example, a semiconductor memory device, such as a random access memory (RAM) or a flash memory, a hard disk, an optical disk, or the like. The event sequence storage unit 120 and the detection event sequence storage unit 121 appropriately store information handled by the sequence generation unit 130, the detection sequence extraction unit 140, and the detection unit 150.

For example, the event sequence storage unit 120 stores therein the event sequence generated by the sequence generation unit 130. Furthermore, the detection event sequence storage unit 121 stores therein the detection event sequence extracted by the detection sequence extraction unit 140. The detection device 100 does not necessarily have to include the event sequence storage unit 120 or the detection event sequence storage unit 121 as components. For example, the detection device 100 may use an external storage device that performs the same process as the event sequence storage unit 120 or the detection event sequence storage unit 121.

The sequence generation unit 130, the detection sequence extraction unit 140, and the detection unit 150 are implemented by, for example, an integrated circuit, such as an application specific integrated circuit (ASIC) or a field programmable gate array (FPGA). Furthermore, the sequence generation unit 130, the detection sequence extraction unit 140, and the detection unit 150 are implemented by, for example, causing a central processing unit (CPU), a micro processing unit (MPU), or the like to execute a program stored in a storage device (not illustrated) by using the RAM as a work area.

The sequence generation unit 130 includes the exclusion event extraction unit 131 and the event sequence generation unit 132, uses the monitoring target NW analysis results and the malware communication analysis result as inputs, and generates an event sequence for each of the inputs. When the monitoring target NW analysis result (for sequence extraction) is input, the exclusion event extraction unit 131 sets an event that is observed in a large number of hosts in the monitoring target NW as an exclusion event in the analysis result. Specifically, the exclusion event extraction unit 131 acquires the total number of hosts and the number of hosts including a predetermined event in the monitoring target NW in the input monitoring target NW analysis result (for sequence extraction). Subsequently, if a percentage of the hosts including the predetermined event exceeds a predetermined value based on a ratio of the number of the hosts including the predetermined event to the total number of the hosts, the exclusion event extraction unit 131 sets the predetermined event as the exclusion event. With this operation, the exclusion event extraction unit 131 makes it possible to generate an event sequence only with events in which a process normally performed by a large number of hosts is eliminated.

The event sequence generation unit 132 generates an event sequence of events that do not correspond to the exclusion event in the monitoring target NW analysis results and the malware communication analysis result. Specifically, the event sequence generation unit 132 acquires an event that does not correspond to the exclusion event as an input from the monitoring target NW analysis result or the malware communication analysis result. At this time, the event sequence generation unit 132 records an event occurrence time of the read event. Then, the event sequence generation unit 132 determines whether an interval between the recorded event occurrence time and a previously-read event occurrence time is equal to or longer than a predetermined time. If the interval between the event occurrence time and the previous event time is not equal to or longer than the predetermined time, the event sequence generation unit 132 estimates that the event is an element of the same event sequence as the previous event, and generates an event sequence of the events subjected to the determination. In this manner, the event sequence generation unit 132 generates an event sequence of events in which a normal process is eliminated; therefore, it is possible to reduce false detection in detecting an infected terminal.

The detection sequence extraction unit 140 includes the common event sequence extraction unit 141, the representative event sequence extraction unit 142, the event matching unit 143, and the candidate determination unit 144, and extracts the detection event sequence on the basis of the event sequences generated by the sequence generation unit 130.

The common event sequence extraction unit 141 extracts common event sequences from the event sequences generated by the sequence generation unit 130. Specifically, the common event sequence extraction unit 141 calculates the similarities among the event sequences extracted from the malware communication analysis result, performs clustering, and extracts events that are commonly observed in the event sequences with the similarities at a predetermined level or higher by taking into account the sequential order. When the events are arranged in chronological order, and if the length of the commonly-observed events is longer than a predetermined length, the common event sequence extraction unit 141 uses the event sequence of the commonly-observed events as a common event sequence.

The representative event sequence extraction unit 142 extracts, as the candidate for the detection event sequence, the representative event sequence based on relationships among events with high occurrence rates in similar common event sequences among the common event sequences extracted by the common event sequence extraction unit 141. Specifically, the representative event sequence extraction unit 142 generates, from the common event sequences, a digraph in which nodes represent events, edges represent the order of occurrence of the events, and weights of the edges represent the numbers of occurrences of before-after relationships of the events, calculates a sum of the weights for each of simple paths of the digraph, and uses a simple path indicating the maximum weight as the representative event sequence.

Figure 5:
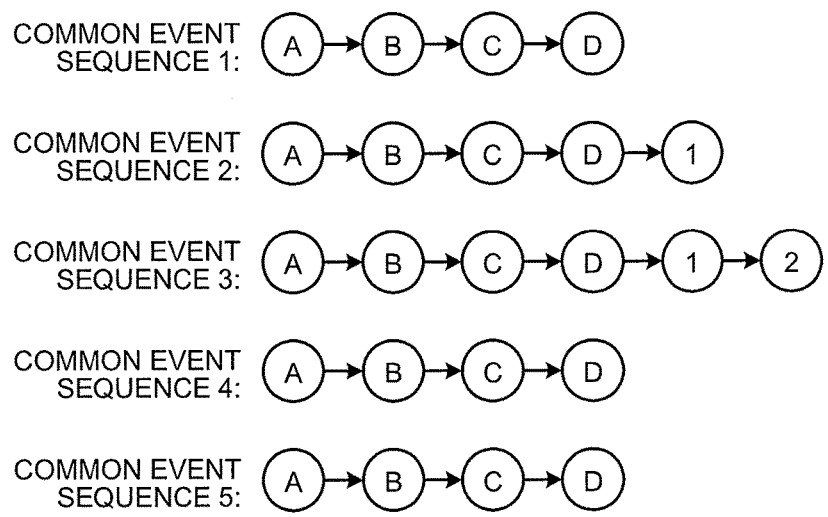
FIG. 5 is a schematic diagram illustrating an example of common event sequences according to the embodiment.

First, with reference to FIG. 5, an example of the common event sequences for extracting the representative event sequence will be described. FIG. 5 illustrates a plurality of common event sequences each being extracted from a single cluster. Furthermore, labels in FIG. 5 indicate events. Moreover, arrows between the events in FIG. 5 indicate the order of occurrence of the events. Meanwhile, common event sequences 1, 4, and 5 in FIG. 5 are the completely same event sequence; therefore, it may be possible to extract the representative event sequence by handling these event sequences as a single unique event sequence.

In some cases, as illustrated in FIG. 5, a certain common event sequence may be included as a part of another common event sequence. For example, a common event sequence "ABCD" represented as the common event sequence 1 in FIG. 5 is included as parts of the common event sequences 2 and 3. Furthermore, a certain common event sequence may be turned into the other event sequence by replacing some of the events. For example, in the case of a common event sequence "ABC1EF", "ABC2EF" or "ABC3EF" in which "1" is replaced with "2" or "3" may be present.

A method of extracting the representative event sequence by the representative event sequence extraction unit 142 will be described based on the assumption that similar sequences as described above are included in the common event sequences in the same cluster. First, the representative event sequence extraction unit 142 specifies a cluster as an extraction target, and generates an event sequence graph from the common event sequences included in the specified cluster. Here, the event sequence graph is a digraph in which nodes represent events, edges represent the order of occurrence of the events, and weights of the edges represent the numbers of occurrences of before-after relationships of the events. The representative event sequence extraction unit 142 assigns nodes indicating a top and an end at the top and the end of the event sequence graph.

Figure 6:
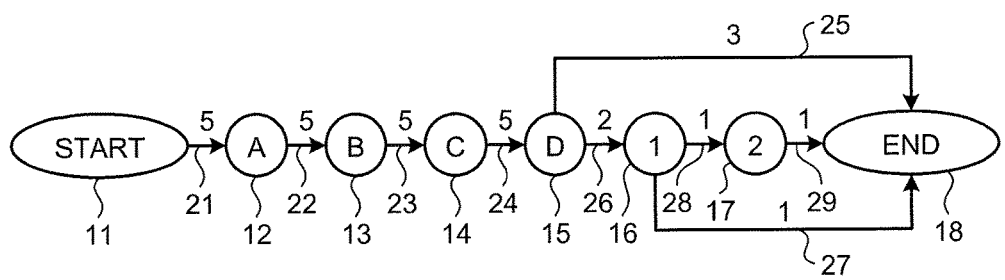
FIG. 6 is a schematic diagram illustrating an example of an event sequence graph generated from the common event sequences according to the embodiment.

With reference to FIG. 6, a detailed example of the event sequence graph will be described. FIG. 6 is a schematic diagram illustrating an example of the event sequence graph generated from the common event sequences according to the embodiment. As illustrated in FIG. 6, the representative event sequence extraction unit 142 represents events as nodes, represents arrows indicating the order of occurrence of the events as edges, and represents the numbers of occurrences of the before-after relationships of the events as weights of the edges. Furthermore, a node 11 with a label "START" indicates the top of the event sequence graph. Moreover, a node 18 with a label "END" indicates the end of the event sequence graph.

Figure 7:
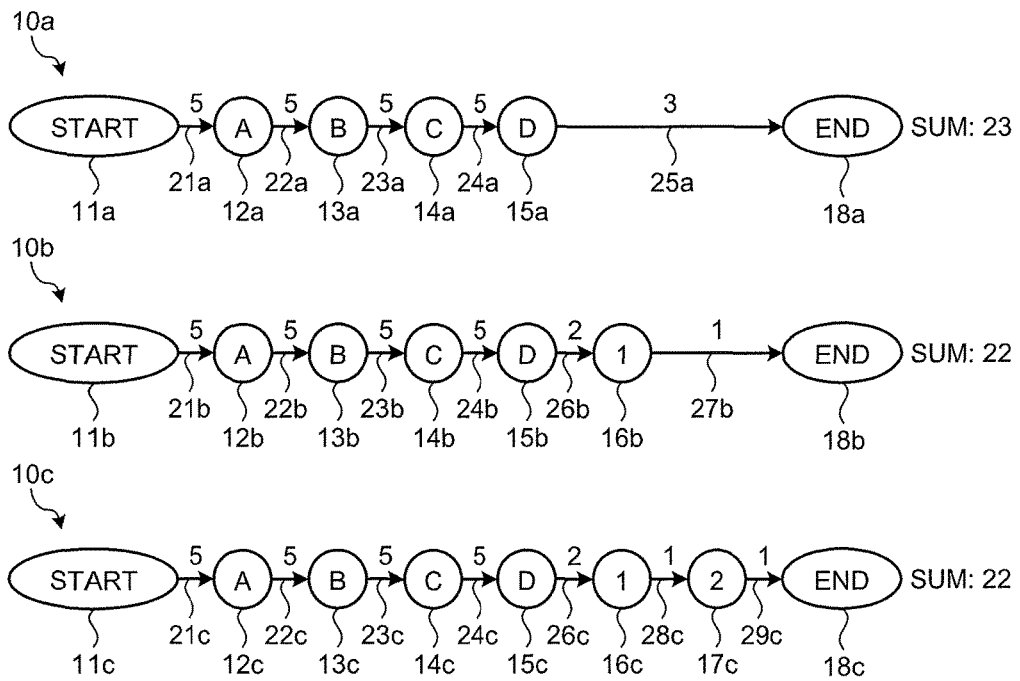
FIG. 7 is a schematic diagram illustrating an example of simple paths generated from the event sequence graph according to the embodiment.

As illustrated in FIG. 7, the representative event sequence extraction unit 142 first generates the event sequence graph, and extracts simple paths from the start point to the end point of the event sequence graph. FIG. 7 is a schematic diagram illustrating an example of the simple paths generated from the event sequence graph according to the embodiment. Subsequently, the representative event sequence extraction unit 142 determines whether it is possible to extract the representative event sequence for each of the extracted simple paths. Hereinafter, the procedure for extracting the representative event sequence by the representative event sequence extraction unit 142 will be described in detail.

In this case, the representative event sequence extraction unit 142 may use, as the nodes in the diagraph, events for which the numbers of occurrences of the before-after relationships of the events are equal to or greater than a predetermined value. For example, in the example in FIG. 6, if the predetermined value is set to 2, the number of occurrences of the before-after relationship of a node 17 is 1 that is not equal to or greater than the predetermined value; therefore, the node 17 is not included in the nodes of the event sequence graph.

First, the representative event sequence extraction unit 142 sets the top of the graph as an "event (before)" and a next event as an "event (after)" for each of the simple paths. Subsequently, the representative event sequence extraction unit 142 sets a skip flag to false, and initializes the weight of the representative event sequence to zero. Then, the representative event sequence extraction unit 142 determines whether a value obtained by dividing the number of occurrences between the "event (before)" and the "event (after)" by the number of the common event sequences serving as the basis of the event sequence graph is equal to or greater than a threshold set in advance.

Firstly, a case will be described in which the value obtained by dividing the number of occurrences between the "event (before)" and the "event (after)" by the number of the common event sequences serving as the basis of the event sequence graph is equal to or greater than the threshold set in advance. In this case, the representative event sequence extraction unit 142 determines whether the skip flag is set to true. If the skip flag is set to true, the representative event sequence extraction unit 142 selects the "event (before)" as an element of the representative sequence, and sets the skip flag to false. Then, the representative event sequence extraction unit 142 selects the "event (after)" as an element of the representative event sequence, and adds the number of occurrences between the "event (before)" and the "event (after)" to the weight of the representative event sequence. The skip flag is always set to false in the first operation; however, because the above-described processes are repeated for each of the events, the skip flag may be set to false in some cases and set to true in some other cases in the second or later operation.

Secondly, a case will be described in which the value obtained by dividing the number of occurrences between the "event (before)" and the "event (after)" by the number of the common event sequences serving as the basis of the event sequence graph is smaller than the threshold set in advance. In this case, the representative event sequence extraction unit 142 sets the skip flag to true.

Thereafter, if the "event (after)" matches the end point of the graph, the representative event sequence extraction unit 142 performs determination on a next simple path. If the "event (after)" does not match the end point, the representative event sequence extraction unit 142 sets the "event (after)" as the "event (before)", sets an event next to the "event (after)" as a new "event (after)", and continues the process. Then, after performing the determination on all of the simple paths, the representative event sequence extraction unit 142 outputs, as the representative event sequence of the cluster, the representative event sequence with the maximum weight among all of the representative event sequences. If a plurality of representative event sequences with the maximum weights are present, the representative event sequence extraction unit 142 may output all of the representative event sequences as the representative event sequences, or may output the representative event sequence including the greatest number of events or the representative event sequence including the smallest number of events. Furthermore, if a ratio of the length of the representative event sequence to the maximum value of the lengths of the common event sequences belonging to the cluster is smaller than a predetermined value, the representative event sequence extraction unit 142 may use the common event sequences as the representative event sequences.

With reference to FIG. 7, the procedure for extracting the representative event sequence by the representative event sequence extraction unit 142 will be described with a detailed example. Firstly, an example will be described in which determination on a simple path 10a is performed. The representative event sequence extraction unit 142 first sets a node 11a as the "event (before)" and sets a node 12a as the "event (after)". Subsequently, the representative event sequence extraction unit 142 sets the skip flag to false, sets the threshold to 0.3, and initializes the weight of the representative event sequence to zero. Here, the weight of an edge 21a indicating the number of occurrences between the node 11a and the node 12a is 5, and a value obtained by dividing the weight by 5 that is the number of the common event sequences serving as the basis of the event sequence graph is 1; therefore, the representative event sequence extraction unit 142 determines that the calculated value is equal to or greater than the threshold.

Then, the representative event sequence extraction unit 142 does not select the node 11a as an element of the representative sequence because the skip flag is set to false, and does not change the skip flag from false. The representative event sequence extraction unit 142 selects the node 12a as an element of the representative event sequence, and adds 5 that is the weight of the edge 21a indicating the number of occurrences between the node 11a and the node 12a to the weight of the representative event sequence.

Subsequently, the representative event sequence extraction unit 142 repeats the same process for the node 12a and a node 13a, for the node 13a and a node 14a, and for the node 14a and a node 15a. Then, the representative event sequence extraction unit 142 sets the node 15a as the "event (before)" and sets a node 18a as the "event (after)". Here, the weight of an edge 25a indicating the number of occurrences between the node 15a and the node 18a is 3, and a value obtained by dividing the weight by 5 that is the number of the common event sequences serving as the basis of the event sequence graph is 0.6; therefore, the representative event sequence extraction unit 142 determines that the calculated value is equal to or greater than the threshold.

Then, the representative event sequence extraction unit 142 selects the node 18a that is the "event (after)" as an element of the representative event sequence, and adds 3 that is the weight of the edge 25a indicating the number of occurrences between the node 15a serving as the "event (before)" and the node 18a serving as the "event (after)" to the weight of the representative event sequence. Then, because the "event (after)" matches the node 18a serving as the end point of the graph, the representative event sequence extraction unit 142 ends the determination on the simple path 10a, and performs determination on a next simple path. At this time, the weights of the edges 21a, 22a, 23a, 24a, and 25a are added to the weight of the representative event sequence, so that a sum of the weights of the simple path 10a is 23. In this case, the representative event sequence extracted from the simple path 10a is "ABCD".

Secondly, an example will be described in which determination on a simple path 10b is performed. The representative event sequence extraction unit 142 first sets a node 11b as the "event (before)" and sets a node 12b as the "event (after)". Subsequently, the representative event sequence extraction unit 142 sets the skip flag to false, sets the threshold to 0.3, and initializes the weight of the representative event sequence to zero. Here, the weight of an edge 21b indicating the number of occurrences between the node 11b and the node 12b is 5 and a value obtained by dividing the weight by 5 that is the number of the common event sequences serving as the basis of the event sequence graph is 1; therefore, the representative event sequence extraction unit 142 determines that the calculated value is equal to or greater than the threshold.

Then, the representative event sequence extraction unit 142 does not select the node 11b as an element of the representative sequence because the skip flag is set to false, and does not change the skip flag from false. The representative event sequence extraction unit 142 selects the node 12b as an element of the representative event sequence, and adds 5 that is the weight of the edge 21b indicating the number of occurrences between the node 11b and the node 12b to the weight of the representative event sequence.

Subsequently, the representative event sequence extraction unit 142 repeats the same process for the node 12b and a node 13b, for the node 13b and a node 14b, for the node 14b and a node 15b, and for the node 15b and a node 16b. Then, the representative event sequence extraction unit 142 sets the node 16b as the "event (before)" and sets a node 18b as the "event (after)". Here, the weight of an edge 27b indicating the number of occurrences between the node 16b and the node 18b is 1, and a value obtained by dividing the weight by 5 that is the number of the common event sequences serving as the basis of the event sequence graph is 0.2; therefore, the representative event sequence extraction unit 142 determines that the calculated value is smaller than the threshold and changes the skip flag to true. In this case, the representative event sequence extraction unit 142 does not add 1 that is the weight of the edge 27b indicating the number of occurrences between the node 16b serving as the "event (before)" and the node 18b serving as the "event (after)" to the weight of the representative event sequence.

Then, because the "event (after)" does not match a node 18b serving as the end point of the graph, the representative event sequence extraction unit 142 sets the node 16b that has served as the "event (after)" as the "event (before)", sets the node 18b that is an event next to the "event (after)" as a new "event (after)", and continues the process.

Then, because the "event (after)" matches the node 18b serving as the end point of the graph, the representative event sequence extraction unit 142 ends the determination on the simple path 10b, and performs determination on a next simple path. At this time, the weights of the edges 21b, 22b, 23b, 24b, and 26b are added to the weight of the representative event sequence, so that a sum of the weights of the simple path 10b is 22. In this case, the representative event sequence extracted from the simple path 10b is "ABCD1".

Thirdly, an example will be described in which determination on a simple path 10c is performed. The representative event sequence extraction unit 142 first sets a node 11c as the "event (before)" and sets a node 12c as the "event (after)". Subsequently, the representative event sequence extraction unit 142 sets the skip flag to false, sets the threshold to 0.3, and initializes the weight of the representative event sequence to zero. Here, the weight of an edge 21c indicating the number of occurrences between the node 11c and the node 12c is 5 and a value obtained by dividing the weight by 5 that is the number of the common event sequences serving as the basis of the event sequence graph is 1, the representative event sequence extraction unit 142 determines that the calculated value is equal to or greater than the threshold.

Then, the representative event sequence extraction unit 142 does not select the node 11c as an element of the representative event sequence because the skip flag is set to false, and does not change the skip flag from false. The representative event sequence extraction unit 142 selects the node 12c as an element of the representative event sequence, and adds 5 that is the weight of the edge 21c indicating the number of occurrences between the node 11c and the node 12c to the weight of the representative event sequence.

Subsequently, the representative event sequence extraction unit 142 repeats the same process for the node 12c and a node 13c, for the node 13c and a node 14c, for the node 14c and a node 15c, and for the node 15c and a node 16c. Then, the representative event sequence extraction unit 142 sets the node 16c as the "event (before)" and sets a node 17c as the "event (after)". Here, the weight of an edge 28c indicating the number of occurrences between the node 16c and the node 17c is 1, and a value obtained by dividing the weight by 5 that is the number of the common event sequences serving as the basis of the event sequence graph is 0.2; therefore, the representative event sequence extraction unit 142 determines that the calculated value is smaller than the threshold and changes the skip flag to true. In this case, the representative event sequence extraction unit 142 does not add 1 that is the weight of the edge 28c indicating the number of occurrences between the node 16c serving as the "event (before)" and the node 17c serving as the "event (after)" to the weight of the representative event sequence.

Then, because the "event (after)" does not match a node 18c serving as the end point of the graph, the representative event sequence extraction unit 142 sets the node 17c that has served as the "event (after)" as the "event (before)", sets the node 18c that is an event next to the "event (after)" as a new "event (after)", and continues the process.

Here, the weight of an edge 29c indicating the number of occurrences between the node 17c serving as the "event (before)" and the node 18c serving as the "event (after)" is 1, and a value obtained by dividing the weight by 5 that is the number of the common event sequences serving as the basis of the event sequence graph is 0.2; therefore, the representative event sequence extraction unit 142 determines that the calculated value is smaller than the threshold and does not change the skip flag from true. In this case, the representative event sequence extraction unit 142 does not add 1 that is the weight of the edge 29c indicating the number of occurrences between the node 17c serving as the "event (before)" and the node 18c serving as the "event (after)" to the weight of the representative event sequence.

Then, because the "event (after)" matches the node 18c serving as the end point of the graph, the representative event sequence extraction unit 142 ends the determination on the simple path 10c. At this time, the weights of the edges 21c, 22c, 23c, 24c, and 26c are added to the weight of the representative event sequence, so that a sum of the weights of the simple path 10c is 22. In this case, the representative event sequence extracted from the simple path 10c is "ABCD1".

The representative event sequence extraction unit 142 compares the sums of the weights of the representative event sequences extracted from the simple paths 10a, 10b, and 10c, and finds that the sum of the weights of the representative event sequence extracted from the simple path 10a is 23, and the sums of the weights of the representative event sequences extracted from the simple paths 10b and 10c are 22. Therefore, the representative event sequence extraction unit 142 selects the representative event sequence "ABCD" extracted from the simple path 10a with the greatest sum of the weights as the representative event sequence of the cluster.

Meanwhile, if a ratio of the length of the representative event sequence to the length of the longest common event sequence in the same cluster is smaller than a predetermined value, the representative event sequence extraction unit 142 may use all of the common event sequences in the cluster as the representative event sequences. For example, if the predetermined value is set to 0.5, if the representative event sequence is "AB", and if the longest common event sequence "ABCDE" is included in the same cluster, a ratio of the length of the representative event sequence to the length of the longest common event sequence is 0.4 that is smaller than the predetermined value; therefore, all of the common event sequences including the common event sequence "ABCDE" are used as the representative event sequences. That is, if the length of the representative event sequence with respect to the maximum length of the common event sequences is smaller than a predetermined value, it is determined that it is difficult to generate an event sequence representing the common event sequences in the cluster, and the common event sequences are used as the representative event sequences.

As described above, the representative event sequence extraction unit 142 performs clustering of the event sequences and uses common events as elements of the representative event sequence; therefore, even when subspecies of malware that perform similar operations occur, if a characteristic representing a characteristic common to communications is observed, it is possible to cause the detection unit 150 to perform determination by using the same event sequence. That is, with the representative event sequence extraction unit 142, even in a situation in which the subspecies of malware frequently occur, it is not needed to prepare a large number of event sequences to be used for detection, so that it is possible to improve the efficiency of the detection process and extensively deal with the subspecies of malware. Furthermore, the detection device 100 uses only an event sequence that represents common event sequences; therefore, it is possible to reduce the number of event sequences subjected to matching determination and reduce a processing time.

The event matching unit 143 checks whether the event sequence in the monitoring target NW analysis result (for sequence extraction) matches the candidate for the detection event sequence, and calculates how many hosts in the monitoring target NW are detected from each of the candidates for the detection event sequence. Specifically, the event matching unit 143 acquires, as inputs, the event sequence in the monitoring target NW analysis result (for sequence extraction) generated by the sequence generation unit 130 and the candidate for the detection event sequence extracted by the representative event sequence extraction unit 142. Then, the event matching unit 143 checks whether the event sequences in both of the inputs match each other, and calculates the number of hosts corresponding to the monitoring target NW analysis result (for sequence extraction) for which it is determined that the event sequences match each other. Then, the event matching unit 143 outputs, as an output, the calculated number of hosts to the candidate determination unit 144.

Figure 8:
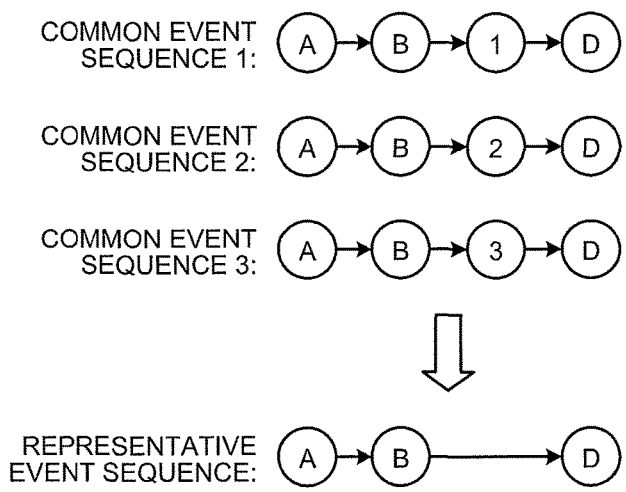
FIG. 8 is a schematic diagram illustrating an example of the common event sequences and a representative event sequence according to the embodiment.

A method of determining whether the candidate for the detection event sequence matches the sequence in the monitoring target NW by the event matching unit 143 will be described below with reference to FIG. 8 and FIG. 9. FIG. 8 is a schematic diagram illustrating an example of the common event sequences and the representative event sequence according to the embodiment. FIG. 9 is a schematic diagram illustrating an example of the process performed by the event matching unit according to the embodiment. Hereinafter, as illustrated in FIG. 8, a case will be described as an example in which the representative event sequence extraction unit 142 extracts a representative event sequence "ABD" from three common event sequences. As described above, in the following descriptions, the candidate for the detection event sequence indicates the representative event sequence extracted by the representative event sequence extraction unit 142.

Here, it is assumed that the event matching unit 143 sets a threshold for a match rate to, for example, 0.8 to determine that the sequences match each other, where the match rate is a ratio of a longest common subsequence (LCS) between the sequence in the monitoring target NW analysis result and the candidate for the detection event sequence to the length of the candidate for the detection event sequence. FIG. 9(*a*) illustrates a sequence obtained by analyzing the monitoring target NW. First, as illustrated in FIG. 9(*b*), when determination is performed by using the common event sequences as the candidates for the detection event sequence, a match rate obtained with respect to the sequence in the monitoring target NW is ¾, i.e., 0.75, in each case. As described above, the match rate to determine that the sequences match each other is 0.8; therefore, the event matching unit 143 determines that the common event sequences do not match the sequence in the monitoring target NW.

Next, as illustrated in FIG. 9(*c*), when detection is performed by using the candidate for the detection event sequence, the match rate with respect to the sequence in the monitoring target NW is ⅗, i.e., 1.0; therefore, the event matching unit 143 determines that the representative event sequence matches the sequence in the monitoring target NW. In this case, if a pattern "ABD" itself is not characteristic for malware infection but a pattern including "1", "2", "3", or the like between "B" and "D" is characteristic for malware infection, the determination performed by the event matching unit 143 using the representative event sequence may result in false detection.

To prevent the false detection as described above, the event matching unit 143 re-calculates the match rate based on the following equations.

First match rate=the LCS length between the candidate for the detection event sequence and the sequence in the monitoring target NW/the sequence length of the candidate for the detection event sequence Second match rate=the sequence length of the candidate for the detection event sequence/the length of the longest common event sequence in the cluster in which the candidate for the detection event sequence is selected Match rate=the first match rate×the second match rate In the example in FIG. 9, the first match rate is ⅗ and the second match rate is ¾; therefore, the match rate is ¾, i.e., 0.75. Therefore, the event matching unit 143 determines that the candidate for the detection event sequence does not match the sequence in the monitoring target NW. The determination method performed by the event matching unit 143 is not limited to the method described herein, and it may be possible to employ a method of using the first match rate as the match rate without using the second match rate.

If a ratio of the number of detected hosts to the total number of hosts in the monitoring target NW is equal to or smaller than a predetermined value based on the number of the detected hosts calculated by the event matching unit 143 for each of the candidates for the detection event sequence, the candidate determination unit 144 outputs the candidate for the detection event sequence as the detection event sequence. Specifically, the candidate determination unit 144 calculates a detected host ratio for each event sequence by dividing the number of the detected hosts in the candidate for the detection event sequence, for which the event matching unit 143 has determined that the event sequences match each other, by the total number of the hosts in the monitoring target NW. Then, the candidate determination unit 144 outputs, as the detection event sequence, an event sequence with the detected host ratio equal to or smaller than the predetermined value from among the candidates for the detection event sequence. With this process, similarly to the process performed by the exclusion event extraction unit 131, the candidate determination unit 144 can eliminate an event sequence that may lead false detection from the detection event sequence in advance by taking into account the fact that only a small number of terminals are generally infected by malware in the monitoring target NW. Therefore, through the process performed by the candidate determination unit 144, it is possible to reduce false detection in detecting an infected terminal in the monitoring target NW.

The detection unit 150 includes the event matching unit 151 and the detection result output unit 152, and detects a malware infected terminal in the monitoring target NW. Specifically, the event matching unit 151 checks whether the event sequences in the monitoring target NW analysis result (for detection) and the detection event sequence match each other. Then, the detection result output unit 152 outputs host information for which it is determined that the event sequence matches the detection event sequence as a result of the matching performed by the event matching unit 151. In other words, the detection result output unit 152 outputs information for identifying a host for which it is determined that the event sequence matches the detection event sequence by assuming that the host for which it is determined that the event sequence matches the detection event sequence serving as a signature is highly likely to be a malware infected terminal, to thereby detect the malware infected terminal. The event matching unit 151 may use the same determination method as the event matching unit 143. In this case, the candidate for the detection event sequence used in the event matching unit 143 is replaced with the detection event sequence in the event matching unit 151.

Flow of Processes

Next, the flow of the detection process performed by the detection device 100 as described above will be described in detail below.

(Exclusion Event Extraction Process)

Figure 10:
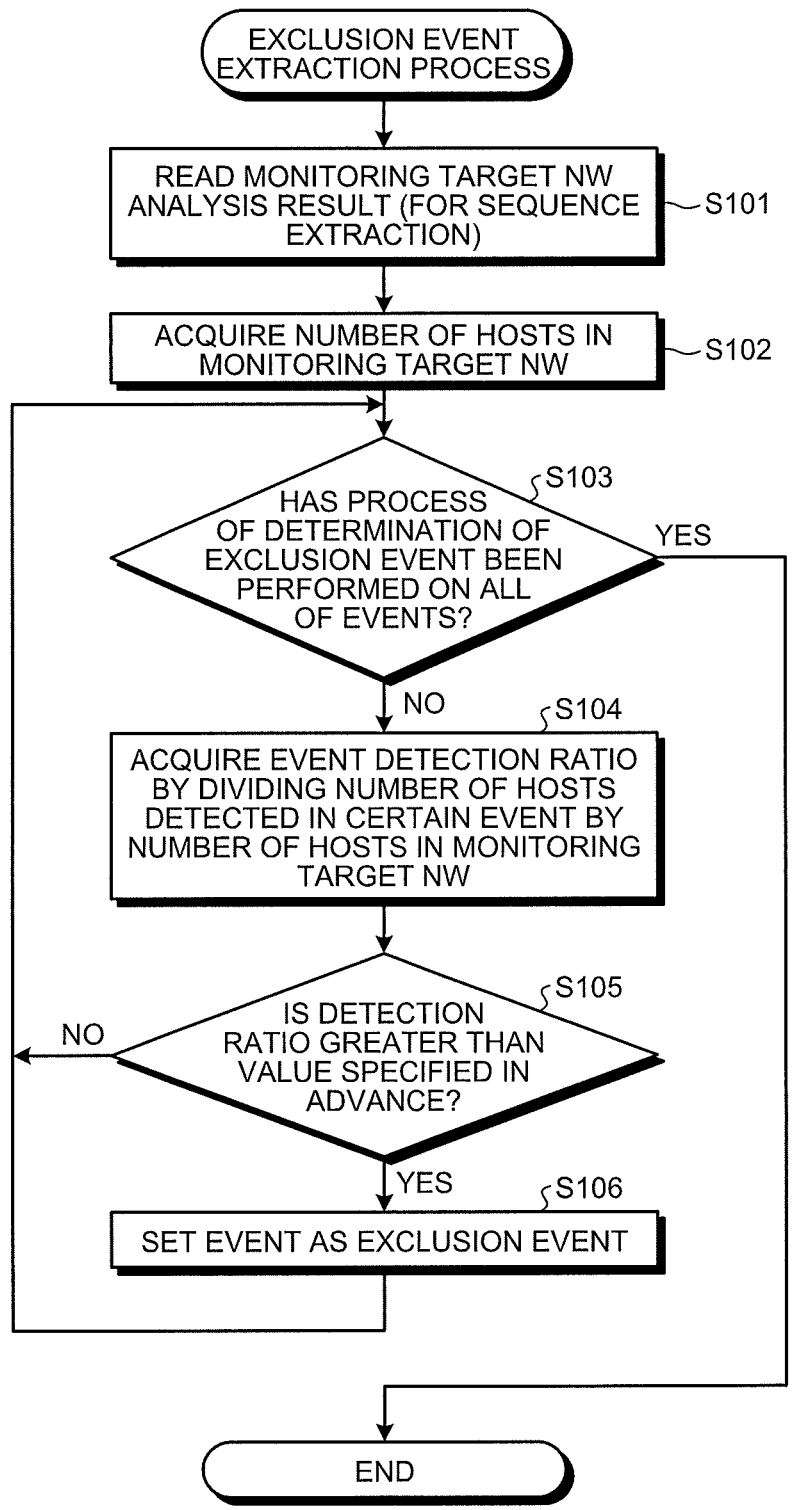
FIG. 10 is a flowchart illustrating the flow of an exclusion event extraction process performed by an exclusion event extraction unit.

First, with reference to FIG. 10, the exclusion event extraction process performed by the exclusion event extraction unit 131 will be described. FIG. 10 is a flowchart illustrating the flow of the exclusion event extraction process performed by the exclusion event extraction unit 131 according to the embodiment.

As illustrated in FIG. 10, the exclusion event extraction unit 131 reads the monitoring target NW analysis result (for sequence extraction) as an input (Step S101). Then, the exclusion event extraction unit 131 acquires the number of hosts in the monitoring target NW (Step S102). Here, if the number of the hosts present in the monitoring target NW is obtained in advance, it may be possible to use the obtained number as the number of the hosts in the monitoring target NW, or it may be possible to use the number of hosts that appear in the monitoring target NW analysis result (for sequence extraction) as the number of the hosts in the monitoring target NW. In other words, the number of the hosts in the monitoring target NW is the total number of hosts that can be observed in the monitoring target NW; therefore, if the total number of existing hosts is observed in advance, the total number of the hosts is applied, and if the total number of the hosts is not obtained, the number of hosts that can be observed in the monitoring target NW analysis result (for sequence extraction) is applied.

Subsequently, the exclusion event extraction unit 131 determines whether a process of determination of an exclusion event has been performed on all of events included in the read monitoring target NW analysis result (for sequence extraction) (Step S103). If it is determined that the process has been performed on all of the events, the exclusion event extraction process ends (YES at Step S103).

In contrast, if it is determined that the process has not been performed on all of the events (NO at Step S103), the exclusion event extraction unit 131 continues the exclusion event extraction process. At this time, the exclusion event extraction unit 131 acquires an event detection ratio by dividing the number of hosts detected in a certain event by the number of the hosts in the monitoring target NW (Step S104).

Then, the exclusion event extraction unit 131 determines whether the detection ratio is greater than a value specified in advance (Step S105). When determining that the detection ratio is greater than the value specified in advance (YES at Step S105), the exclusion event extraction unit 131 sets the event subjected to the determination as the exclusion event (Step S106). In contrast, when determining that the detection ratio is not greater than the value specified in advance (NO at Step S105), the exclusion event extraction unit 131 does not set the event as the exclusion event, and continues the process on a different event (proceeds to Step S103).

As described above, the exclusion event extraction unit 131 determines that an event observed in a large number of hosts does not reflect only a characteristic of a communication caused by malware, extracts the event, and sets the event as the exclusion event. Therefore, the exclusion event extraction unit 131 can reduce false detection in the process of detecting an infected terminal.

(Event Sequence Generation Process)

Figure 11:
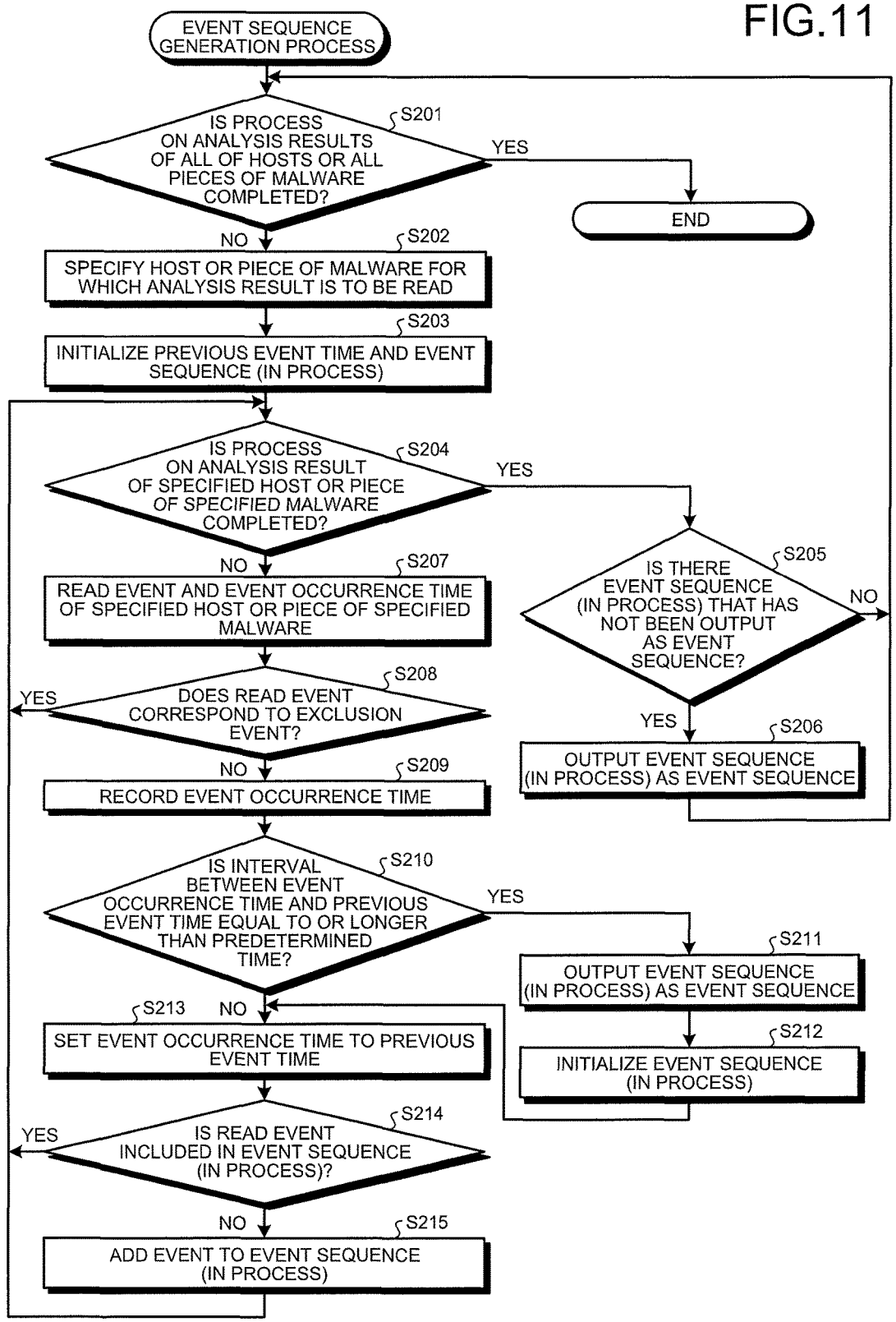
FIG. 11 is a flowchart illustrating the flow of an event sequence generation process performed by an event sequence generation unit.

Next, with reference to FIG. 11, the event sequence generation process performed by the event sequence generation unit 132 will be described. FIG. 11 is a flowchart illustrating the flow of the event sequence generation process performed by the event sequence generation unit 132.

As illustrated in FIG. 11, with respect to an event sequence generation process for the monitoring target NW analysis results (for extraction and for detection) and the malware communication analysis result, the event sequence generation unit 132 determines whether the process on the analysis results of all of the hosts or all pieces of malware is completed (Step S201). If it is determined that the process on all of the results is completed, the event sequence generation process ends (YES at Step S201).

In contrast, when determining that the process on the analysis results of all of the hosts or all pieces of malware is not completed (NO at Step S201), the event sequence generation unit 132 specifies a host or a piece of malware for which the analysis result is to be read (Step S202). The event sequence generation unit 132, when extracting an event sequence from the monitoring target NW analysis results, generates an event sequence for each of the hosts in the monitoring target NW. Here, the hosts are identified by using IP addresses of the hosts, for example. Furthermore, when generating an event sequence from the malware communication analysis result, the event sequence generation unit 132 generates an event sequence for each piece of malware. Here, the pieces of malware are identified by using hash values of the pieces of malware, for example. It is assumed that the monitoring target NW analysis results and the malware communication analysis result are sorted by time at which events are observed.

Then, before a process to be described below, the event sequence generation unit 132 initializes a previous event time and an event sequence (in process) (Step S203).

The event sequence generation unit 132 determines whether the process on the analysis result of the specified host or a piece of the specified malware is completed (Step S204). When determining that the process on the analysis result is completed (YES at Step S204), the event sequence generation unit 132 determines whether there is an event sequence that has not been output as the event sequence (that is, whether there is an event sequence being subjected to the generation process) (Step S205). If there is an event sequence that has not been output as the event sequence (YES at Step S205), the event sequence generation unit 132 outputs the event sequence being processed as the event sequence (Step S206).

In contrast, if there is no event sequence that has not been output as the event sequence (NO at Step S205), the event sequence generation unit 132 causes the process to proceed to Step S201.

When determining that the process on the analysis result is not completed at Step S204 (NO at Step S204), the event sequence generation unit 132 reads an event and an event occurrence time of the specified host or the piece of the specified malware (Step S207). Then, the event sequence generation unit 132 determines whether the read event corresponds to the exclusion event (Step S208). If the event corresponds to the exclusion event (YES at Step S208), the event sequence generation unit 132 does not add the read event to the event sequence, and causes the process to proceed to Step S204. While it is possible to reduce a false detection rate by the process of extracting and excluding the exclusion event, it may be possible not to perform the process of extracting and excluding the exclusion event in the event sequence generation process.

In contrast, if the read event does not correspond to the exclusion event (NO at Step S208), the event sequence generation unit 132 records the event occurrence time of the read event (Step S209). Then, the event sequence generation unit 132 determines whether an interval between the recorded event occurrence time and a previous event time is equal to or longer than a predetermined time (Step S210).

If the interval between the event occurrence time and the previous event time is equal to or longer than the predetermined time (YES at Step S210), the event sequence generation unit 132 outputs the event sequence being processed as the event sequence because the read event is to be added to an event sequence different from the event sequence being processed (Step S211). In this case, the event sequence generation unit 132 initializes the output event sequence (in process) (Step S212).

If the interval between the event occurrence time and the previous event time is not equal to or longer than the predetermined time at Step S210 (NO at Step S210), the event sequence generation unit 132 sets the event occurrence time of the read event to the previous event time (Step S213). In other words, if the interval between the event occurrence time and the previous event time is not equal to or longer than the predetermined time, the event sequence generation unit 132 determines that the event is an element of the same event sequence as the previous event, and determines whether to add the event to the event sequence (in process) (Step S214 to be described later).

Then, the event sequence generation unit 132 determines whether the read event is included in the event sequence (in process) (Step S214). If the read event is included in the event sequence (in process) (YES at Step S214), the event sequence generation unit 132 does not add the redundant event to the event sequence (in process) and causes the process to proceed to Step S204.

In contrast, if the read event is not included in the event sequence (in process) (NO at Step S214), the event sequence generation unit 132 adds the event to the event sequence (in process) (Step S215). Thereafter, the event sequence generation unit 132 causes the process to proceed to Step S204.

As described above, if the read event corresponds to the exclusion event, the event sequence generation unit 132 does not include the event in the event sequence. Furthermore, the event sequence generation unit 132 records the time of occurrence of an event, and compares the time of occurrence of the event with the time of occurrence of the previous event to determine whether an interval between the times is equal to or longer than a predetermined time. With this operation, the event sequence generation unit 132 generates an event sequence such that a single event sequence includes events that have occurred at short intervals. Moreover, the event sequence generation unit 132 determines whether a processing target event is included in the event sequence (in process), and does not add the event to the event sequence if the event is included. That is, the generated event sequence does not include redundant events. It may be possible not to perform the determination of whether to add a redundant event to the event sequence (in process) (Step S214) by taking into account the characteristics of the monitoring target NW analysis results and the malware communication analysis result. For example, if a small number of types of events are observed in the monitoring target NW analysis results and the malware communication analysis result (for example, only a single type is observed), it may be possible to add all of events that do not correspond to the exclusion event to the event sequence (in process) without performing the determination of whether to add a redundant event to the event sequence (in process).

(Common Event Sequence Extraction Process)

Figure 12:
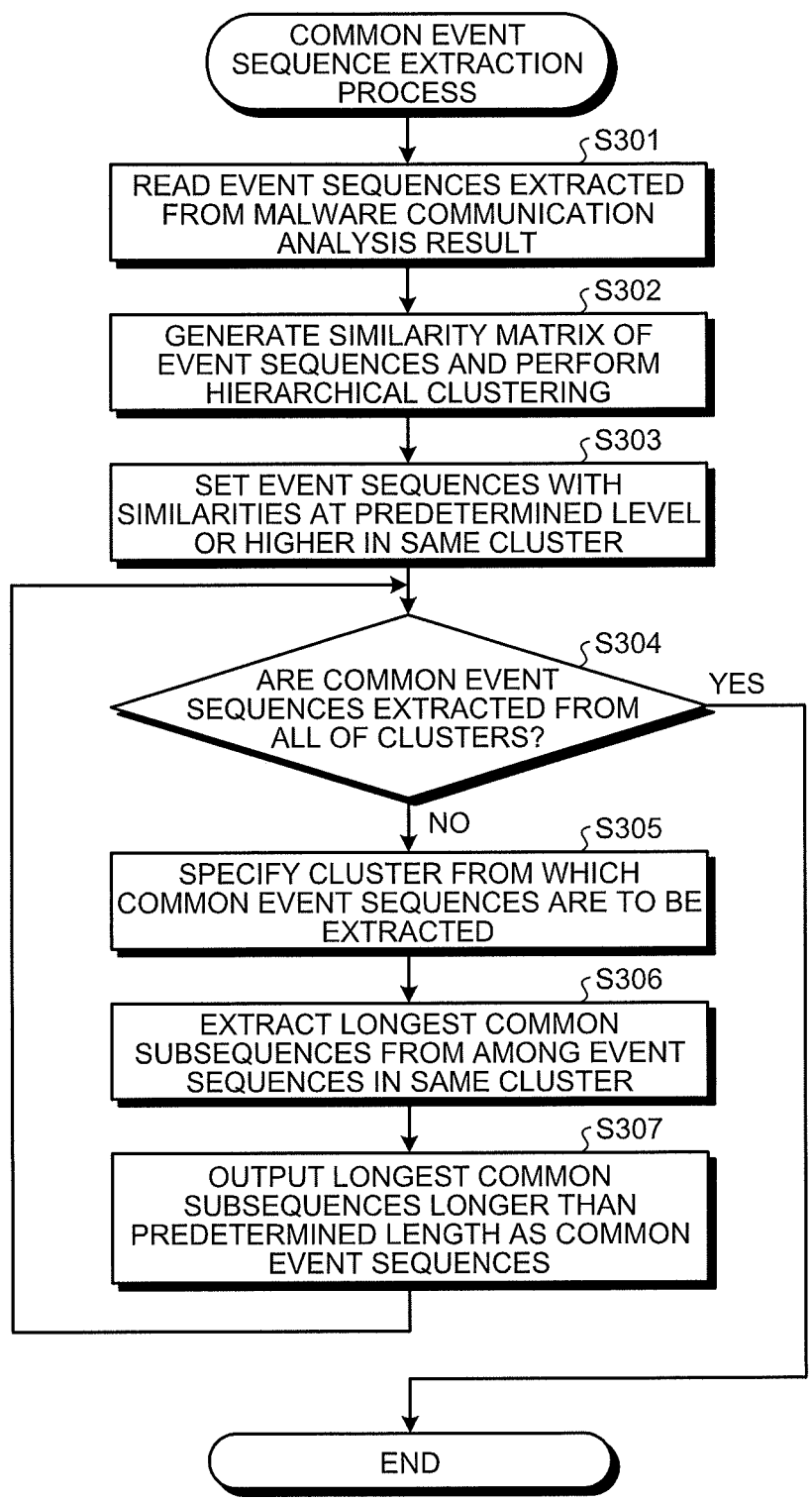
FIG. 12 is a flowchart illustrating the flow of a common event sequence extraction process performed by a common event sequence extraction unit.

Next, with reference to FIG. 12, the common event sequence extraction process performed by the common event sequence extraction unit 141 will be described. FIG. 12 is a flowchart illustrating the flow of the common event sequence extraction process performed by the common event sequence extraction unit 141.

As illustrated in FIG. 12, the common event sequence extraction unit 141 reads, as processing targets, the event sequences extracted from the malware communication analysis result (Step S301). Then, the common event sequence extraction unit 141 generates a similarity matrix of the event sequences and performs hierarchical clustering (Step S302). In the generation of the similarity matrix, for example, a uniquely identifiable character is assigned to each of events, the event sequences are assumed as character strings, and the Levenshtein distance between the event sequences is calculated to obtain the similarities of the event sequences.

Then, the common event sequence extraction unit 141 sets the event sequences with the similarities at a predetermined level or higher in the same cluster in the hierarchical clustering (Step S303).

The common event sequence extraction unit 141 determines whether a process of extracting the common event sequences from all of the clusters is performed (Step S304). When determining that the process of extracting the common event sequences from all of the clusters is performed (YES at Step S304), the common event sequence extraction unit 141 ends the common event sequence extraction process.

In contrast, when determining that the process of extracting the common event sequences from all of the clusters is not performed (NO at Step S304), the common event sequence extraction unit 141 specifies a cluster from which the common event sequences are to be extracted (Step S305).

Then, the common event sequence extraction unit 141 extracts longest common subsequences from among common subsequences between the event sequences in the same cluster (Step S306). The common event sequence extraction unit 141 then extracts longest common subsequences longer than a predetermined length as the common event sequences (Step S307).

As described above, the common event sequence extraction unit 141 performs clustering after calculating the similarities among the event sequences extracted from the malware communication analysis result. Thereafter, the common event sequence extraction unit 141 extracts event sequences that are commonly observed in the event sequences with the similarities at a predetermined level or higher, and sets the extracted event sequences as the common event sequences. When only a single event sequence is included in the single cluster, and if the length of the event sequence is equal to or longer than a predetermined length, the common event sequence extraction unit 141 outputs the event sequence as the common event sequence. Furthermore, the common event sequence extraction unit 141 can arbitrarily set the length of the event sequence to be used as the common event sequence. For example, the common event sequence extraction unit 141 may set, as the minimum length of the event sequence, a sequence including two or more events.

(Representative Event Sequence Extraction Process)

Figure 13:
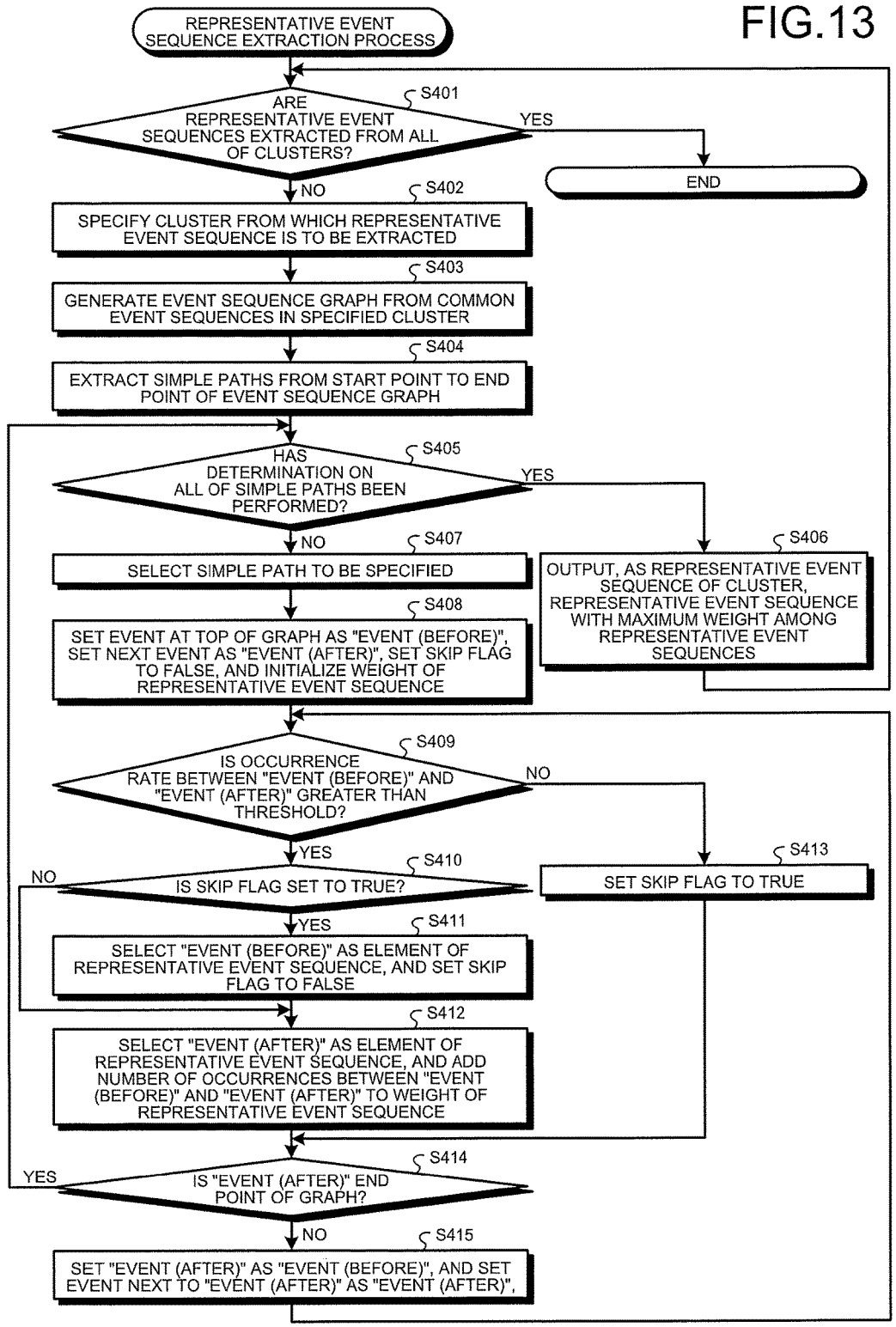
FIG. 13 is a flowchart illustrating the flow of a representative event sequence extraction process performed by a representative event sequence extraction unit.

Next, with reference to FIG. 13, the representative event sequence extraction process performed by the representative event sequence extraction unit 142 will be described. FIG. 13 is a flowchart illustrating the flow of the representative event sequence extraction process performed by the representative event sequence extraction unit.

As illustrated in FIG. 13, the representative event sequence extraction unit 142 determines whether the representative event sequences are extracted from all of the clusters (Step S401). If it is determined that the representative event sequences are extracted from all of the clusters, the representative event sequence extraction process ends (YES at Step S401).

In contrast, when determining that the representative event sequences are not extracted from all of the clusters (NO at Step S401), the representative event sequence extraction unit 142 specifies a cluster from which the representative event sequence is to be extracted (Step S402). Then, the representative event sequence extraction unit 142 generates the event sequence graph from the common event sequences in the specified cluster (Step S403). Furthermore, the representative event sequence extraction unit 142 extracts simple paths from the start point to the end point of the event sequence graph (Step S404).

Subsequently, the representative event sequence extraction unit determines whether determination on all of the simple paths has been performed (Step S405). When determining that the determination on all of the simple paths has been performed (YES at Step S405), the representative event sequence extraction unit 142 outputs, as the representative event sequence of the cluster, a representative event sequence with the maximum weight among the representative event sequences (Step S406). Furthermore, when determining that the determination on all of the simple paths has not been performed (NO at Step S405), the representative event sequence extraction unit 142 selects a simple path to be specified (Step S407).

Upon selecting the path to be specified, the representative event sequence extraction unit 142 sets an event at the top of the graph as the "event (before)", sets a next event as the "event (after)", sets the skip flag to flase, and initializes the weight of the representative event sequence to zero (Step S408). Then, the representative event sequence extraction unit 142 determines whether the occurrence rate between the "event (before)" and the "event (after)" is equal to or greater than a threshold (Step S409). Here, the occurrence rate is a value obtained by dividing the number of occurrences of a relationship between a certain "event (before)" and an "event (after)" in the event sequence graph by the number of the common event sequences included in the event sequence graph. Furthermore, when determining that the occurrence rate between the "event (before)" and the "event (after)" is equal to or greater than the treshold (YES at Step S409), the representative event sequence extraction unit 142 determines whether the skip flag is set to true (Step S410). When determining that the skip flag is set to true (YES at Step S410), the representative event sequence extraction unit 142 selects the "event (before)" as an element of the representative event sequence, and sets the skip flag to false (Step S411).

Subsequently, the representative event sequence extraction unit 142 sets the "event (after)" as an element of the representative event sequence, and adds the number of occurrences between the "event (before)" and the "event (after)" to the weight of the representative event sequence (Step S412). Furthermore, when determining that the occurrence rate between the "event (before)" and the "event (after)" is not equal to or greater than the threshold (NO at Step S409), the representative event sequence extraction unit 142 sets the skip flag to true (Step S413).

Then, if the "event (after)" is not the end point of the graph (NO at Step S414), the representative event sequence extraction unit 142 sets the "event (after)" as the "event (before)", and sets an event next to the "event (after)" as the "event (after)" (Step S415). Furthermore, if the "event (after)" is the end point of the graph (YES at Step S414), the representative event sequence extraction unit 142 determines whether the determination on all of the paths has been performed (Step S405). Meanwhile, the representative event sequences finally output by the representative event sequence extraction unit 142 are used as the candidates for the detection event sequence in subsequent processes.

As described above, the representative event sequence extraction unit 142 performs clustering of the event sequences and sets a common event as an element of the representative event sequence; therefore, even when subspecies of malware that perform similar operations occur, if a characteristic representing the characteristic common to communications is observed, it is possible to cause the detection unit 150 to perform determination by using the same event sequence. That is, with the representative event sequence extraction unit 142, even in a situation in which the subspecies of malware frequently occur, it is not needed to prepare a large number of event sequences to be used for detection, so that it is possible to improve the efficiency of the detection process and extensively deal with the subspecies of malware. Furthermore, the detection device 100 uses only the representative event sequence, so that it is possible to reduce the number of event sequences to be subjected to matching determination and to reduce processing time.

(Candidate Determination Process)

Figure 14:
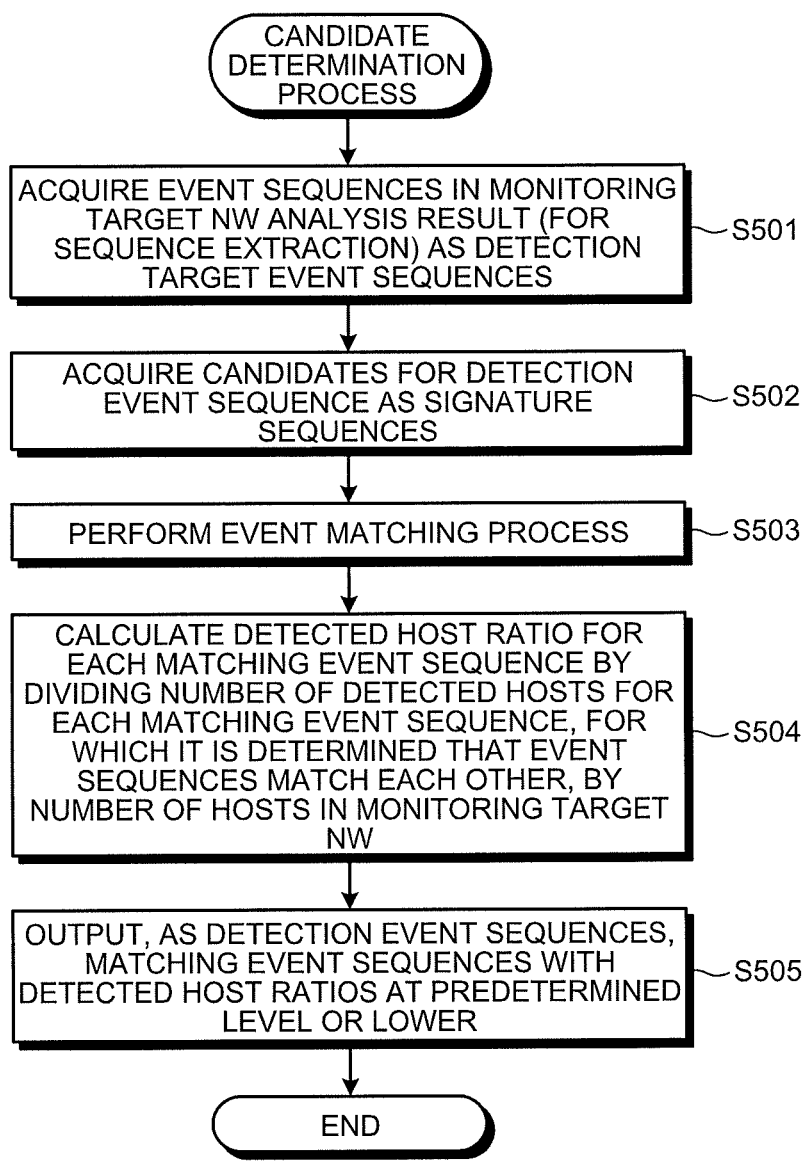
FIG. 14 is a flowchart illustrating the flow of a candidate determination process performed by the event matching unit and a candidate determination unit.

Next, with reference to FIG. 14, the candidate determination process performed by the event matching unit 143 and the candidate determination unit 144 will be described. FIG. 14 is a flowchart illustrating the flow of the candidate determination process performed by the event matching unit 143 and the candidate determination unit 144.

As illustrated in FIG. 14, the event matching unit 143 acquires the event sequences in the monitoring target NW analysis result (for sequence extraction) as detection target event sequences (Step S501). Furthermore, the event matching unit 143 acquires the candidates for the detection event sequence extracted by the common event sequence extraction unit 141 as signature sequences (Step S502).

Then, the event matching unit 143 performs the event matching process on the acquired detection target event sequences and the acquired signature sequences (Step S503). Meanwhile, the event matching process performed by the event matching unit 143 is the same as the event matching process performed by the detection unit 150; therefore, detailed explanation will be given later.

Subsequently, the candidate determination unit 144 calculates a detected host ratio for each matching event sequence by dividing the number of detected hosts for each matching event sequence, for which it is determined that the event sequences match each other in the event matching process, by the number of hosts in the monitoring target NW (Step S504). Here, the matching event sequence is a single event sequence selected from the signature sequences. That is, the candidate determination unit 144 calculates the detected host ratio for each of the event sequences included in the signature sequences. Then, the candidate determination unit 144 outputs, as the detection event sequences, the matching event sequences with the detected host ratios at a predetermined level or lower (Step S505). Thus, the candidate determination process performed by the event matching unit 143 and the candidate determination unit 144 ends.

As described above, when the ratio of the number of the detected hosts to the total number of the hosts in the monitoring target NW is equal to or smaller than a predetermined value based on the number of the detected hosts for each of the candidates for the detection event sequence subjected to matching by the event matching unit 143, the candidate determination unit 144 outputs the candidate for the detection event sequence as the detection event sequence. This process is performed to eliminate an event sequence that may cause false detection from the detection event sequences by taking into account the fact that only a small number of terminals are generally infected by malware in the monitoring target NW, similarly to the process performed by the exclusion event extraction unit 131.

Specifically, if it is assumed that a small number of terminals are infected by malware in the monitoring target NW, the candidate for the detection event sequence for which it is determined that the event sequences match each other in the process can be regarded as an event sequence that is observed not only in communications caused by malware but also in normal communications, and therefore can be determined as an event sequence that is likely to cause false detection when used in detection. Therefore, by causing the candidate determination unit 144 to perform the process of previously excluding an event sequence of communications caused by malware that are difficult to distinguish from normal communications, it is possible to reduce false detection by the detection unit. For example, the detection device 100 may output, as the detection event sequence, only an event sequence for which a result obtained by dividing the number of the detected hosts for each of the matching event sequences, for which it is determined that the event sequences match each other in the event matching process, by the number of the hosts in the monitoring target NW is zero, i.e., an event sequence for which an event sequence of the monitoring target NW analysis result (for sequence extraction) is not detected among the candidates for the detection event sequences. With this operation, the detection device 100 can prevent an event sequence that may cause false detection from being included in the detection event sequences.

(Detection Process)

Figure 15:
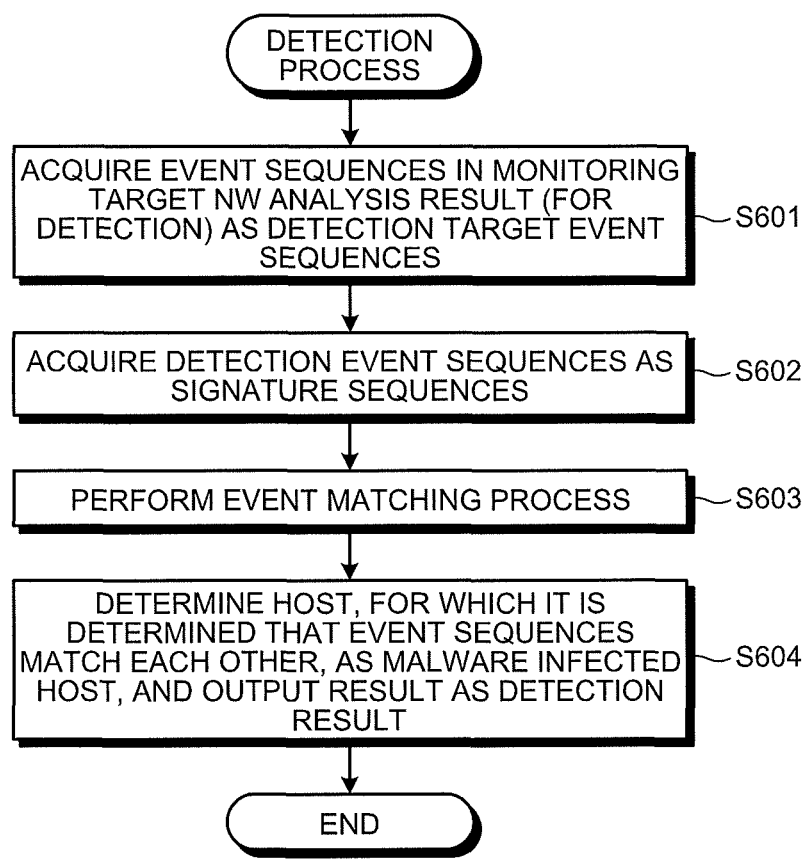
FIG. 15 is a flowchart illustrating the flow of a detection process performed by a detection unit.

Next, with reference to FIG. 15, the detection process performed by the detection unit 150 will be described. FIG. 15 is a flowchart illustrating the flow of the detection process performed by the detection unit 150.

As illustrated in FIG. 15, the event matching unit 151 of the detection unit 150 acquires the event sequences in the monitoring target NW analysis result (for detection) as detection target event sequences (Step S601). Furthermore, the event matching unit 151 acquires the detection event sequences extracted by the detection sequence extraction unit 140 as the signature sequences (Step S602). Then, the event matching unit 151 performs the event matching process on the acquired detection target event sequences and the acquired signature sequences (Step S603).

Subsequently, the detection result output unit 152 of the detection unit 150 determines a host for which it is determined that the event sequences match each other in the event matching process as a malware infected host, and outputs the result as a detection result (Step S604). Thus, the detection process performed by the detection unit 150 ends.

As described above, the detection unit 150 checks whether the event sequences in the monitoring target NW analysis result (for detection) generated by the sequence generation unit 130 and the detection event sequences extracted by the detection sequence extraction unit 140 match each other. With this operation, the detection unit 150 can check whether the event sequences, from which an event that can be observed in the monitoring target NW and the chronological order of events are eliminated, match each other; therefore, it is possible to reduce the possibility of false detection of a communication that normally occurs in the monitoring target NW, and it is possible to detect a malware infected terminal.

(Matching Process)

Figure 16:
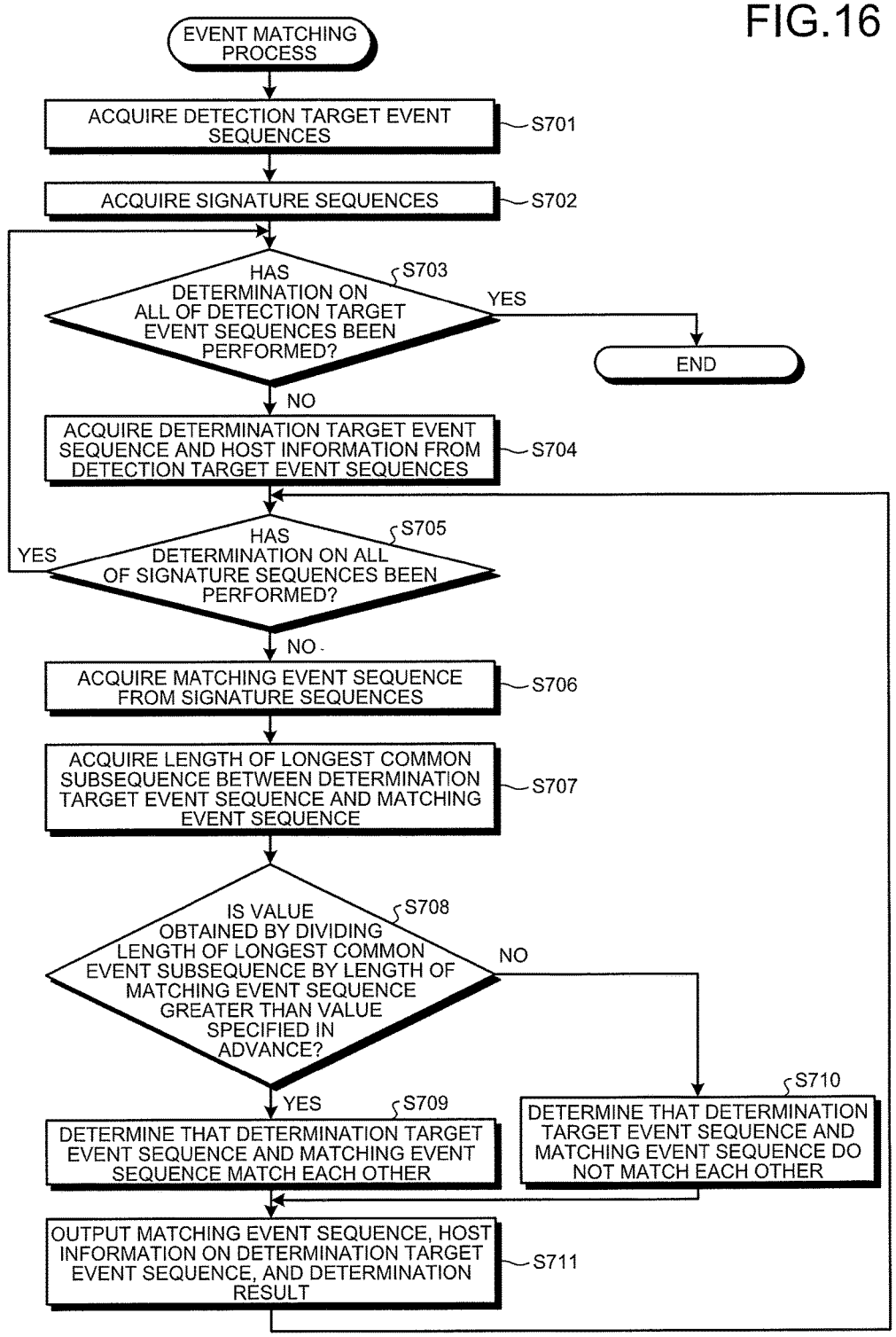
FIG. 16 is a flowchart illustrating the flow of a matching process performed by the event matching unit.

Next, with reference to FIG. 16, the matching process performed by the event matching unit 151 of the detection unit 150 will be described. FIG. 16 is a flowchart illustrating the flow of the matching process performed by the event matching unit 151. The event matching unit 143 of the detection sequence extraction unit 140 performs the same process as described below.

As illustrated in FIG. 16, the event matching unit 151 acquires the event sequences in the monitoring target NW analysis result (for detection) as detection target event sequences (Step S701). Furthermore, the event matching unit 151 acquires the detection event sequences extracted by the detection sequence extraction unit 140 as the signature sequences (Step S702).

Then, the event matching unit 151 determines whether determination on all of the detection target event sequences has been performed (Step S703). If the determination on all of the detection target event sequences has been performed (YES at Step S703), the event matching unit 151 ends the matching process.

In contrast, if the determination on all of the detection target event sequences has not been performed (NO at Step S703), the event matching unit 151 acquires a determination target event sequence and host information from the detection target event sequences (Step S704). Then, the event matching unit 151 determines whether determination on all of the signature sequences has been performed for the detection target host based on the acquired host information (Step S705). When determining that the determination on all of the signature sequences has been performed (YES at Step S705), the event matching unit 151 returns the process to Step S703.

In contrast, when determining that the determination on all of the signature sequences has not been performed (NO at Step S705), the event matching unit 151 acquires a matching event sequence from the signature sequences (Step S706). Then, the event matching unit 151 acquires the length of the longest common subsequence between the determination target event sequence and the matching event sequence (Step S707).

Subsequently, the event matching unit 151 determines whether a value obtained by dividing the length of the longest common subsequence by the length of the matching event sequence is greater than a value specified in advance (Step S708). If the obtained value is greater than the value specified in advance (YES at Step S708), the event matching unit 151 determines that the determination target event sequence and the matching event sequence match each other (Step S709).

In contrast, if the obtained value is not greater than the value specified in advance (NO at Step S708), the event matching unit 151 determines that the determination target event sequence and the matching event sequence do not match each other (Step S710).

Then, the event matching unit 151 outputs the matching event sequence, the host information on the determination target event sequence, and the determination result (Step S711). Then, the event matching unit 151 causes the process to proceed to Step S705.

As described above, the event matching unit 151 performs the matching process with respect to the event sequence serving as a detection target, by using an event sequence extracted based on a communication characteristic for malware as the signature sequence. Therefore, the detection device 100 can detect the terminal infected by malware having similar communication patterns, with less false detection.

The same process as described in the embodiment may be implemented by a detection system that includes a terminal device in the monitoring target NW and the detection device 100. In this case, the terminal device generates a predetermined event in the monitoring target NW, and the detection device 100 acquires events for each of the terminal devices. Furthermore, the system for detecting a malware infected terminal may include an information processing apparatus that virtually generates a communication of malware. In this case, the detection device 100 included in the detection system acquires an event generated by the information processing apparatus as a malware analysis result.

Advantageous Effects

As described above, the detection device 100 according to the embodiment generates an event sequence based on the chronological order by taking into account the order of occurrence of events, from events that match a rule characterizing a communication among communications in the monitoring target NW and communications caused by malware and that are acquired for each of identifiers that distinguish among terminals in the monitoring target NW and pieces of malware. Then, the detection device 100 calculates the similarities between the event sequences based on communications caused by malware, sets the event sequences with the similarities at a predetermined level or higher in the same cluster, retrieves events that commonly occur in the event sequences belonging to the same cluster, and extracts, as the common event sequences, event sequences in which the retrieved events are connected in chronological order in a predetermined length or longer. Furthermore, the detection device 100 extracts, as the detection event sequence, the representative event sequence based on a relationship between events that have high occurrence rates in similar common event sequences among the plurality of common event sequences. When it is determined that the event sequences match each other based on a first match rate, which is a ratio of the length of a matched portion between a determination target event sequence as the event sequence based on the communication in the monitoring target NW and the detection event sequence to the length of the detection event sequence, the detection device 100 detects that a malware infected terminal is present in the monitoring target NW.

With this configuration, the detection device 100 according to the embodiment can reduce signatures serving as patterns to be matched in the monitoring target NW, so that it is possible to reduce time taken for the matching. Furthermore, the detection device 100 does not use a communication of a single piece of malware as a signature, but uses, as the detection event sequence (signature), a set of event sequences representing common event sequences among the event sequences that are clustered based on the malware communication analysis result. With this configuration, the detection device 100 can detect not only known malware but also subspecies of malware that perform communications similarly to the known malware.

Furthermore, the detection device 100 generates, from the common event sequences, a digraph in which nodes represent events, edges represent the order of occurrence of the events, and weights of the edges represent the numbers of occurrences of before-after relationships of the events. Then, the detection device 100 calculates a sum of the weights for each of the simple paths of the digraph, and uses a simple path indicating the maximum weight as the representative event sequence. With this configuration, the detection device 100 can extract the representative event sequence that allows to perform detection in the most efficient manner from the similar common event sequences.

Moreover, the detection device 100 calculates a sum of the weights of the edges whose weights are equal to or greater than a predetermined threshold among the edges included in the simple paths of the digraph, and uses a simple path with the maximum sum of the weights as the representative event sequence. With this configuration, the detection device 100 can reduce events to be extracted as the representative event sequence in advance, so that it is possible to reduce processes.

Furthermore, when a ratio of the length of the representative event sequence to the length of the longest common event sequence in the same cluster is smaller than a predetermined value, the detection device 100 uses the common event sequences in the same cluster as the representative event sequences. With this configuration, when it is difficult to extract an event sequence that represents a cluster, it is possible to prevent generation of an extremely short representative event sequence, and it is possible to reduce false detection.

Moreover, when a value obtained by multiplying the first match rate, which is a ratio of the length of the matched portion between the determination target event sequence as the event sequence based on a communication in the monitoring target network and the detection event sequence to the length of the detection event sequence, by the second match rate, which is a ratio of the length of the detection event sequence to the length of the longest common event sequence in a cluster to which the detection event sequence belongs, is equal to or greater than a predetermined threshold, the detection device 100 determines that the determination target event sequence and the detection event sequence match each other, and detects that a malware infected terminal is present in the monitoring target network. With this configuration, it is possible to reduce false detection.

(Configuration Etc.)

The components illustrated in the drawings are functionally conceptual and do not necessarily have to be physically configured in the manner illustrated in the drawings. In other words, specific forms of distribution and integration of the devices are not limited to those illustrated in the drawings, and all or part of the devices may be functionally or physically distributed or integrated in arbitrary units depending on various loads or use conditions. Furthermore, for each processing function performed by each device, all or any part of the processing function may be implemented by a CPU and a program analyzed and executed by the CPU or may be implemented as hardware by wired logic.

Of the processes described in the embodiment, all or part of a process described as being performed automatically may also be performed manually. Alternatively, all or part of a process described as being performed manually may also be performed automatically by known methods. In addition, the processing procedures, control procedures, specific names, and information including various kinds of data and parameters illustrated in the above-described document and drawings may be arbitrarily changed unless otherwise specified.

(Program)

It may be possible to generate a program in which the process performed by the detection device 100 according to the above-described embodiment is written in a language that can be executed by a computer. In this, it is possible to obtain the same effects as those described in the embodiment by causing the computer to execute the program. Furthermore, it may be possible to record the program in a computer readable recording medium, and cause a computer to read and execute the program recorded in the recording medium to implement the same processes as those described in the embodiment. An example of the computer that executes a detection program that implements the same functions as those of the detection device 100 will be described below.

Figure 17:
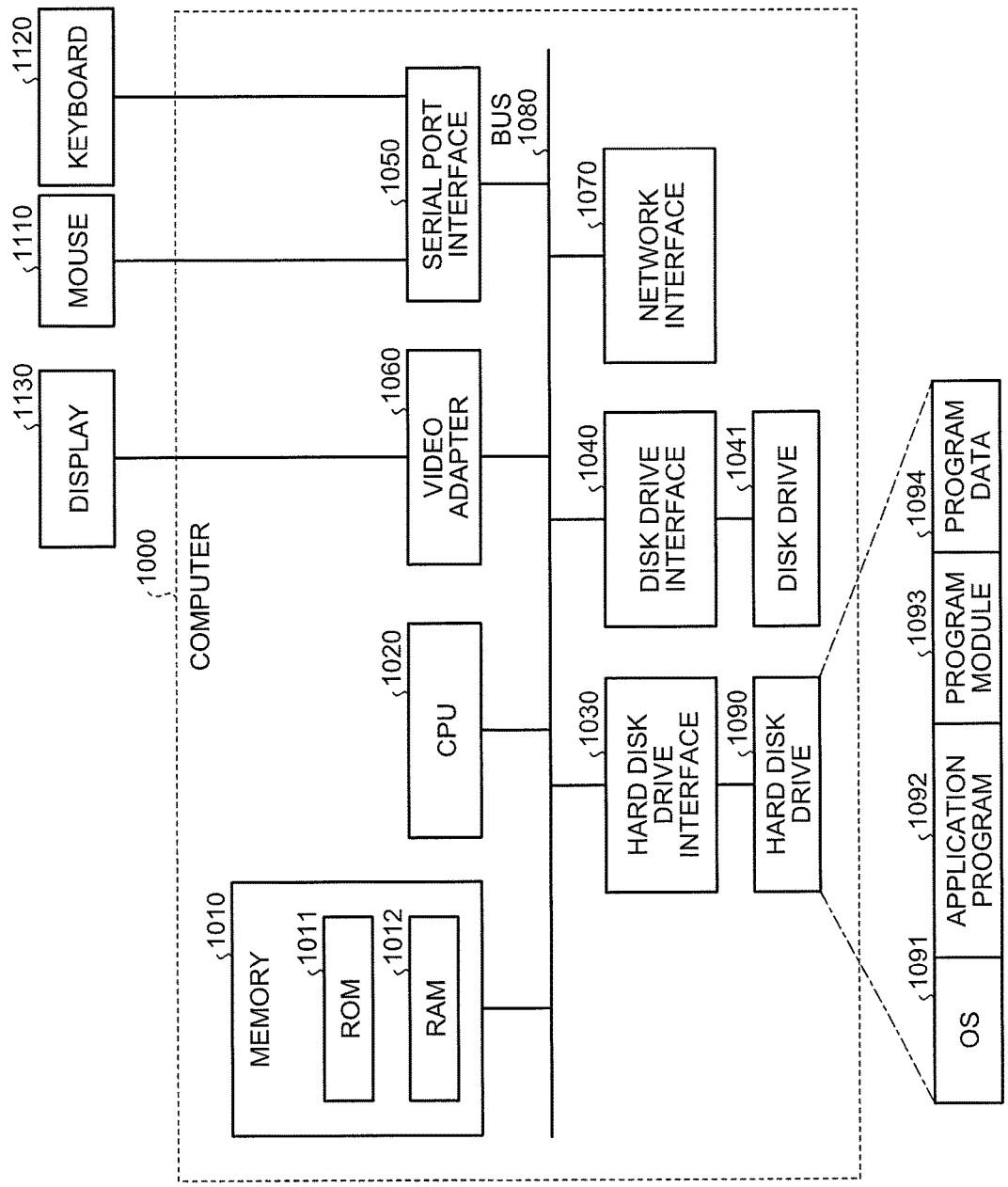
FIG. 17 is a schematic diagram illustrating a computer that executes a program for detecting a malware infected terminal.

FIG. 17 is a schematic diagram illustrating a computer that executes a program for detecting a malware infected terminal. As illustrated in FIG. 17, a computer 1000 includes, for example, a memory 1010, a central processing unit (CPU) 1020, a hard disk drive interface 1030, a disk drive interface 1040, a serial port interface 1050, a video adapter 1060, and a network interface 1070. These components are connected to one another via a bus 1080.

The memory 1010 includes a read only memory (ROM) 1011 and a random access memory (RAM) 1012. The ROM 1011 stores therein, for example, a boot program, such as a basic input output system (BIOS). The hard disk drive interface 1030 is connected to a hard disk drive 1090. The disk drive interface 1040 is connected to a disk drive 1041. In the disk drive 1041, for example, a removable storage medium, such as a magnetic disk or an optical disk, is inserted. A mouse 1110 and a keyboard 1120 are connected to the serial port interface 1050, for example. A display 1130 is connected to the video adapter 1060, for example.

As illustrated in FIG. 17, the hard disk drive 1090 stores therein, for example, an OS 1091, an application program 1092, a program module 1093, and program data 1094. The information described in the embodiment is stored in, for example, the hard disk drive 1090 or the memory 1010.

Furthermore, the detection program is stored in the hard disk drive 1090 as a program module in which commands to be executed by the computer 1000 are written, for example. Specifically, a program module in which the processes performed by the detection device 100 as described in the embodiment are written is stored in the hard disk drive 1090.

Moreover, data used for information processing by the detection program is stored in the hard disk drive 1090 as program data, for example. The CPU 1020 reads the program module 1093 or the program data 1094 stored in the hard disk drive 1090 onto the RAM 1012 as appropriate, and executes the processes as described above.

The program module 1093 and the program data 1094 of the detection program do not necessarily have to be stored in the hard disk drive 1090, but may be stored in a removable storage medium and read by the CPU 1020 via the disk drive 1041 or the like, for example. Alternatively, the program module 1093 and the program data 1094 of the detection program may be stored in other computers connected to a network, such as a local area network (LAN) or a wide area network (WAN), and may be read by the CPU 1020 via the network interface 1070.

REFERENCE SIGNS LIST

100 DETECTION DEVICE
130 SEQUENCE GENERATION UNIT
131 EXCLUSION EVENT EXTRACTION UNIT
132 EVENT SEQUENCE GENERATION UNIT
140 DETECTION SEQUENCE EXTRACTION UNIT
141 COMMON EVENT SEQUENCE EXTRACTION UNIT
142 REPRESENTATIVE EVENT SEQUENCE EXTRACTION UNIT
143 EVENT MATCHING UNIT
144 CANDIDATE DETERMINATION UNIT
150 DETECTION UNIT
151 EVENT MATCHING UNIT
152 DETECTION RESULT OUTPUT UNIT

The invention claimed is:

1. A device for detecting a malware infected terminal, the device comprising:
   a sequence generation unit that generates an event sequence from events that match a rule characterizing a communication among communications in a monitoring target network and communications caused by malware and that are acquired for each of identifiers that distinguish among terminals in the monitoring target network or pieces of malware, by taking into account an order of occurrence of the events;
   a detection sequence extraction unit that
      retrieves events that commonly occur in event sequences belonging to a same cluster among clusters including event sequences with similarities at a predetermined level or higher among event sequences based on a communication caused by malware,
      extracts, as common event sequences, event sequences in which the retrieved events are connected in chronological order in a predetermined length or longer, and
      extracts, as a detection event sequence, a representative event sequence based on a relationship between events that have high occurrence rates in similar common event sequences among the plurality of common event sequences; and
   a detection unit that detects that a malware infected terminal is present in the monitoring target network when it is determined that the event sequence generated by the sequence generation unit based on a communication in the monitoring target network and the detection event sequence extracted by the detection sequence extraction unit match each other.

2. The device for detecting a malware infected terminal according to claim 1, wherein the detection sequence extraction unit generates, from the common event sequences, a digraph in which nodes represent the events, edges represent an order of occurrence of the events, and weights of the edges represent numbers of occurrences of before-after relationships of the events, calculates a sum of the weights for each of simple paths of the digraph, and uses a simple path with a maximum sum of the weights as the representative event sequence.

3. The device for detecting a malware infected terminal according to claim 2, wherein the detection sequence extraction unit calculates a sum of the weights of edges whose weights are equal to or greater than a predetermined threshold among the edges included in the simple paths of the digraph, and uses a simple path with a maximum sum of the weights as the representative event sequence.

4. The device for detecting a malware infected terminal according to claim 1, wherein the detection sequence extraction unit uses all of the common event sequences included in the same cluster as the representative event sequences when a ratio of a length of the representative event sequence to a length of a longest common event sequence in the same cluster is smaller than a predetermined value.

5. The device for detecting a malware infected terminal according to claim 1, wherein when a value obtained by multiplying a first match rate, which is a ratio of a length of a matched portion between a determination target event sequence as an event sequence based on a communication in the monitoring target network and the detection event sequence to a length of the detection event sequence, by a second match rate, which is a ratio of the length of the detection event sequence to a length of a longest common event sequence in a cluster to which the detection event sequence belongs, is equal to or greater than a predetermined threshold, the detection unit determines that the determination target event sequence and the detection event sequence match each other, and detects that a malware infected terminal is present in the monitoring target network.

6. A system for detecting a malware infected terminal, the system comprising:
   a malware execution environment;
   a monitoring target network; and
   a device for detecting a malware infected terminal, wherein
   the device for detecting a malware infected terminal includes
      a sequence generation unit that generates an event sequence from events that match a rule characterizing a communication among communications in the monitoring target network and communications caused by malware executed in the malware execution environment and that are acquired for each of identifiers that distinguish among terminals in the monitoring target network or pieces of malware, by taking into account an order of occurrence of the events;
      a detection sequence extraction unit that
         retrieves events that commonly occur in event sequences belonging to a same cluster among clusters including event sequences with similarities at a predetermined level or higher among event sequences based on a communication caused by malware,
         extracts, as common event sequences, event sequences in which the retrieved events are connected in chronological order in a predetermined length or longer, and
         extracts, as a detection event sequence, a representative event sequence based on a relationship between events that have high occurrence rates in similar common event sequences among the plurality of common event sequences; and
      a detection unit that detects that a malware infected terminal is present in the monitoring target network when it is determined that the event sequence generated by the sequence generation unit based on a communication in the monitoring target network and the detection event sequence extracted by the detection sequence extraction unit match each other.

7. A method for detecting a malware infected terminal executed in a system for detecting the malware infected terminal, the system including a malware execution environment, a monitoring target network, and a device for detecting a malware infected terminal, the method comprising:
   generating an event sequence from events that match a rule characterizing a communication among communications in the monitoring target network and communications caused by malware executed in the malware execution environment and that are acquired for each of identifiers that distinguish among terminals in the monitoring target network or pieces of malware, by taking into account an order of occurrence of the events;
   retrieving events that commonly occur in event sequences belonging to a same cluster among clusters including event sequences with similarities at a predetermined level or higher among event sequences based on a communication caused by malware;
   extracting, as common event sequences, event sequences in which the retrieved events are connected in chronological order in a predetermined length or longer;
   extracting, as a detection event sequence, a representative event sequence based on a relationship between events that have high occurrence rates in similar common event sequences among the plurality of common event sequences; and
   detecting that a malware infected terminal is present in the monitoring target network when it is determined that the event sequence generated at the generating based on a communication in the monitoring target network and the detection event sequence extracted at the extracting match each other.

8. A non-transitory computer-readable recording medium having stored therein a program, for detecting a malware infected terminal, that causes a computer to execute a process, comprising:
   generating an event sequence from events that match a rule characterizing a communication among communications in a monitoring target network and communications caused by malware and that are acquired for each of identifiers that distinguish among terminals in the monitoring target network or pieces of malware, by taking into account an order of occurrence of the events;
   retrieving events that commonly occur in event sequences belonging to a same cluster among clusters including event sequences with similarities at a predetermined level or higher among event sequences based on a communication caused by malware;
   extracting, as common event sequences, event sequences in which the retrieved events are connected in chronological order in a predetermined length or longer;
   extracting, as a detection event sequence, a representative event sequence based on a relationship between events that have high occurrence rates in similar common event sequences among the plurality of common event sequences; and
   detecting that a malware infected terminal is present in the monitoring target network when it is determined that the event sequence generated at the generating based on a communication in the monitoring target network and the detection event sequence extracted at the extracting match each other.

* * * * *